United States Patent [19]

Noguchi et al.

[11] 4,086,885
[45] May 2, 1978

[54] CARBURETOR FOR STRATIFIED INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[21] Appl. No.: 755,583

[22] Filed: Dec. 30, 1976

Related U.S. Application Data

[63] Continuation of Ser. No. 531,741, Dec. 11, 1974, abandoned.

[30] Foreign Application Priority Data

| Dec. 13, 1973 | Japan | 48/139888 |
|---|---|---|
| Dec. 27, 1973 | Japan | 49/26974 |
| Feb. 6, 1974 | Japan | 49/15653 |
| Feb. 11, 1974 | Japan | 49/16480 |
| Feb. 18, 1974 | Japan | 49/19968 |
| Jun. 18, 1974 | Japan | 49/69973 |
| Aug. 5, 1974 | Japan | 49/90173 |
| Sep. 2, 1974 | Japan | 49/101107 |

[51] Int. Cl.² ............... F02B 3/00; F02B 75/02
[52] U.S. Cl. ................. 123/32 ST; 123/3; 123/75 B; 261/23 A; 261/44 R; 261/50 A
[58] Field of Search ........... 261/44 R, 23 A, 50 A; 123/3, DIG. 4, 32 ST, 127, 75 B

[56] References Cited

U.S. PATENT DOCUMENTS

| 3,283,751 | 11/1966 | Goossak et al. | 123/32 R |
|---|---|---|---|
| 3,439,658 | 4/1969 | Simonet | 261/23 A |
| 3,512,508 | 5/1970 | Winkler | 261/50 A |
| 3,543,736 | 12/1970 | Suzuki et al. | 123/32 ST |
| 3,721,428 | 3/1973 | Gele et al. | 261/50 A |
| 3,734,473 | 5/1973 | Moriya et al. | 261/44 R |
| 3,916,851 | 11/1975 | Otani | 123/32 ST |
| 3,918,419 | 11/1975 | Dolza | 123/32 ST |
| 3,934,562 | 1/1976 | Isaka | 123/32 ST |

FOREIGN PATENT DOCUMENTS

| 1,576,528 | 6/1970 | Germany | 261/44 R |
|---|---|---|---|

Primary Examiner—Charles J. Myhre
Assistant Examiner—Craig R. Feinberg
Attorney, Agent, or Firm—Cushman, Darby & Cushman

[57] ABSTRACT

A carburetor for an internal combustion engine of the stratified combustion type supplies a rich air-fuel mixture in the neighborhood of the ignition plug in each cylinder and a lean air-fuel mixture in the remaining space in the cylinder. The carburetor comprises an air horn, a fuel jet having a nozzle open to the air horn, and main and auxiliary ducts branching from the air horn downstream of the fuel nozzle and extending parallel to each other. Air-fuel mixture produced from both air introduced into the air horn and fuel supplied from the fuel jet is led to both the main and auxiliary ducts. At this time, the rich air-fuel mixture is collected in the auxiliary duct, which is closer to the fuel nozzle, and lean air-fuel mixture is collected in the main duct, which is spaced further from the fuel nozzle. The main and auxiliary ducts are respectively provided with main and auxiliary throttle valves, which are controlled by the accelerator pedal.

53 Claims, 14 Drawing Figures

CARBURETOR FOR STRATIFIED INTERNAL COMBUSTION ENGINE

This is a continuation of application Ser. No. 531,741 filed Dec. 11, 1974 and now abandoned.

This invention relates to internal conbustion engines and, more particularly, to carburetors for supplying air-fuel mixture to stratified internal combustion engines.

The stratified internal combustion engine has recently been proposed to the end of reducing the contents of harmful components (such as NOx, CO and HC) in the exhaust gas from internal combustion engines. In this type of engine, lean and rich air-fuel mixtures are supplied for forming a rich air-fuel mixture layer in the neighborhood of a ignition plug while forming a lean air-fuel mixture layer in the rest of the cylinder. Here, the rich mixture is ignited through spark discharge by the ignition plug, and the flame thus produced is used to ignite and combust the lean mixture which cannot be ignited through the ordinary spark discharge. Generally, the contents of harmful components in the exhaust gas produced from the internal combustion engine have bearings upon the average air-fuel ratio of the air-fuel mixture; within a certain constant range of the air-fuel ratio the harmful components may be reduced by increasing the air-fuel ratio. The above-mentioned stratified internal combustion engine utilizes this fact to reduce the harmful components. From the standpoint of the output of the internal combustion engine, however, with high air-fuel ratio the engine output is rendered low, so that smooth and efficient operation of the engine cannot be expected. Accordingly, in order for the stratified internal combustion engine to provide sufficient performance, the over-all air-fuel ratio of the sum of rich and lean air-fuel mixtures has to be accurately set to a predetermined value.

However, the well-known carburetors for the stratified internal combustion engines usually consist of a main carburetor for producing the lean air-fuel mixture and an auxiliary carburetor for producing the rich air-fuel mixture independently of the main carburetor. Therefore, the construction is inevitably complicated, and the adjustment for accurately setting the afore-said over-all air-fuel ratio to the predetermined value is very difficult. More particularly, in the well-known carburetor it is necessary to set four variables, namely the air-fuel ratio and amount of the rich mixture, and the air-fuel ratio and amount of the lean mixture. These four variables have to be mutually related to set the over-all air-fuel ratio to the predetermined value and further the setting involves extreme difficulties in practice.

In the light of the foregoing difficulties, the carburetor according to this invention features an air horn provided with a single fuel nozzle and branching at the downstream of the air horn into a main duct and an auxiliary duct. The lean air-fuel mixture is collected in the main duct and the rich air-fuel mixture is collected in the auxiliary duct since sprayed fuel is greatly distributed on the side of the fuel nozzle and less distributed on the opposite side of the fuel nozzle.

In addition to the above feature, this invention also has features that the auxiliary fuel nozzle for issuing fuel at the time of non-load or low-load engine operating conditions is provided in the auxiliary duct, that control means for varying the sectional area ratio between the main and auxiliary ducts is provided, and that an ignition plug for improving the quality of the air-fuel mixture and gasifying the mixture is provided in the auxiliary duct.

The first object of this invention is to provide a carburetor, which is simple in construction and readily permits the setting of the over-all air-fuel ratio.

The second object of the invention is to provide a carburetor, which further permits the supply of an adequate air-fuel mixture under all engine operating conditions.

The third object of the invention is to provide a carburetor, by which the collection of the rich air-fuel mixture in the auxiliary duct and the lean air-fuel mixture in the main duct can be reliably achieved.

The fourth object of the invention is to provide a carburetor, by which the rich air-fuel mixture can be made optimum with respect to uniform distribution to individual cylinders and complete combustion within the cylinders.

The above features, objects and advantages of invention will become more apparent from the following description taken in conjunction with the accompanying drawings, in which.

This invention will now be described in conjunction with the illustrated embodiments. The carburetor according to the invention may be applied to any stratified internal combustion engine where the supply of lean and rich layers of air-fuel mixture is required for combustion.

Figure 1:
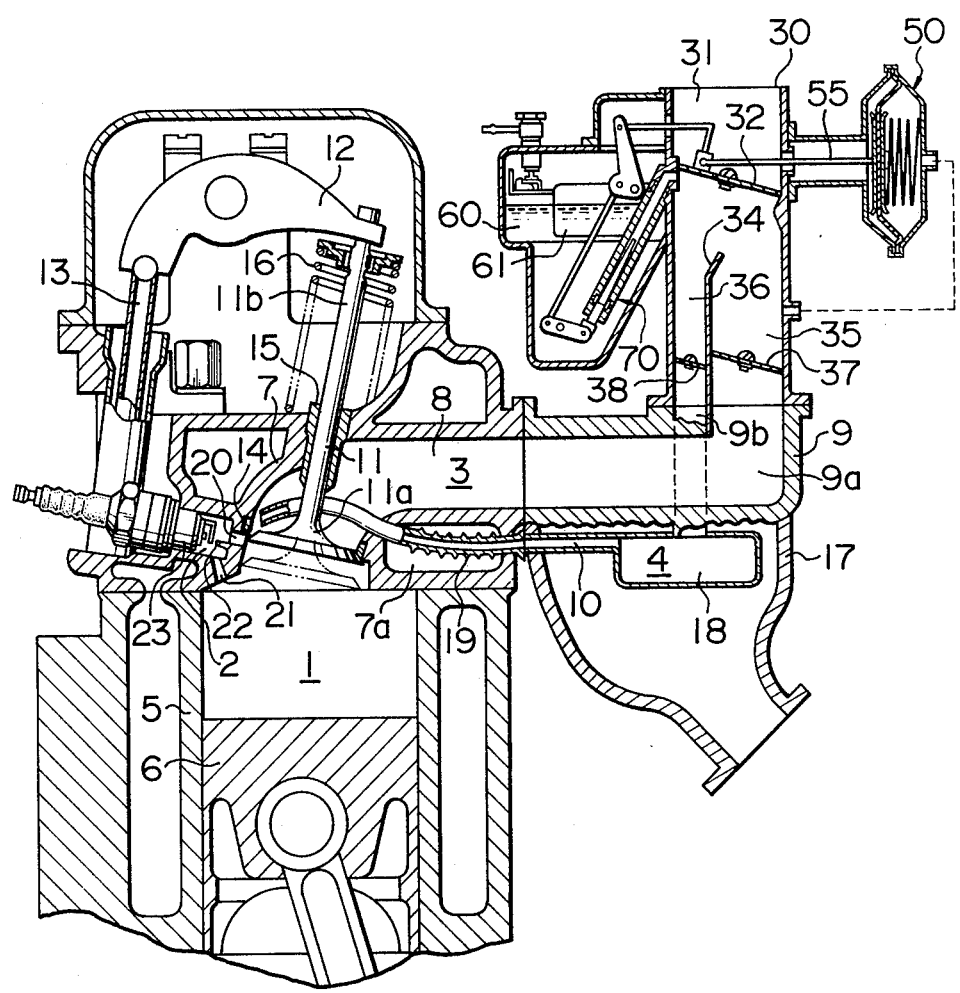
FIG. 1 is a sectional view showing a stratified internal combustion engine incorporating a carburetor embodying this invention.

FIG. 1 shows a stratified internal combustion engine incorporating a carburetor embodying the invention. The construction of this internal combustion engine will first be described. In this engine, the combustion chamber consists of a main combustion chamber 1 and an auxiliary combustion chamber 2. The air-fuel mixture is supplied to these chambers 1 and 2 through respective channels. More particularly, the lean air-fuel mixture is introduced to the main combustion chamber 1 through a main intake channel 3, and the rich air-fuel mixture is introduced to the auxiliary combustion chamber 2 through an auxiliary intake channel 4. The main combustion chamber 1 is defined by the inner peripheral surface of a cylinder block 5, the top surface of a piston 6 received in the cylinder block 5 and the bottom surface of a cylinder head 7 secured to the top of the cylinder block 5. The auxiliary combustion chamber 2 is formed in the cylinder head 7 by cutting the head to a predetermined extent from the outer surface of the head toward the top of the main combustion chamber 1. The main intake channel 3 consists of an intake port 8 formed in the cylinder head 7 and communicating with the main combustion chamber 1 and a passage 9a within an intake manifold 9 mounted on the cylinder head 7. The auxiliary intake channel 4 consists of a passage 9b in the intake manifold 9 and a suction passage 10. An intake valve 11 consisting of a head 11a and a stem 11b is provided to extend in the boundary between the main combustion chamber 1 and the intake part 8 in the main intake channel 3. The intake valve 11 is linked through a rocker arm 12 coupled to the upper end of the stem 11b and a push rod 13 coupled to the rocker arm 12 as well as a cam and crank mechanism (not shown) to the piston 6 so that it may be moved back and forth in accordance with the reciprocation of the piston 6. The head 11a co-operates with a valve seat 14 to control the communication between the main intake channel 3 and the combustion chamber 1, according to the back-and-forth movement of the cam and crank mechanism. The intake valve 11 is guided by a valve guide 15 secured to the cylinder head 7 and it is spring-biased with a valve spring 16 in a valve closing direction. The suction passage 10 of the auxiliary intake channel 4 has an open end disposed within the intake port 8 in the main intake channel 4 on the side of the auxiliary combustion chamber 2 and in the vicinity of the back of the head 11a of the intake valve 11, so that the on-off control of the auxiliary intake channel 4 is substantially effected by the intake valve 11 in synchromisn with the on-off control of the main intake channel 3. The suction passage 10 of the auxiliary intake channel 4 passes through an exhaust manifold 17 and it further passes, through a cooling water channel 7a formed in the cylinder head 7. The suction passage 10 has a vaporization chamber 18, within the exhaust manifold 17, having an increased sectional space and within the cooling water channel 7a it is provided with fins 19 to promote the heat exchange between the exhaust gas and cooling water. The main intake channel 3 is provided, at the portion defined by a wall 9a of the intake manifold 9, with heat-exchanging means with respect to the exhaust gas in the exhaust manifold 17. The auxiliary combustion chamber 2 is provided with at least two apertures, namely an suction aperture 20 and a discharge aperture 21, which are located in the neighborhood of the head 11a of the intake valve 11 and adapted to communicate with the main combustion chamber 1. More particularly, the suction aperture 20 is open to the proximity of the intake port 8, while the discharge aperture 21 is located at a position closer to the top of the piston 6. In other words, the positional relation of the suction and discharge apertures 20 and 21 to the intake valve 11 is such that in the open or advanced position of the intake valve 11 the head 11a is positioned between these apertures (as indicated by broken lines in the Figure). The auxiliary combustion chamber 2 is provided with a separating wall located between the suction and discharge apertures 20 and 21. This separating wall 22 divides a portion of the auxiliary combustion chamber 2 on the side of the main combustion chamber 1 into two sections, namely one on the side of the suction aperture 20 and the other on the side of the discharge aperture 21. An ignition plug 23 for spark discharge is disposed within the auxiliary combustion chamber 2, and a well-known ignition circuit (not shown) in connected to the ignition plug 23.

In the stratified internal combustion engine of the above construction, the lean air-fuel mixture is supplied through the main intake channel 3, while the rich air-fuel mixture is supplied through the auxiliary intake channel 4 for stratified combustion that results in the manner to be described hereinafter, whereby harmful components in the exhaust gas can be reduced. When in the suction stroke the intake valve 11 is brought to an open position indicated in FIG. 1 by the broken lines, with the piston 6 down-stroked, the lean air-fuel mixture from the main intake channel 3 is admitted into the main combustion chamber 1 and at the same time the rich air-fuel mixture from the auxiliary channel 4 is trapped in the auxiliary combustion chamber 2. With the above construction, the trapping of the rich air-fuel mixture in the auxiliary combustion chamber 2 is achieved owing to the discharging of the residual gas in the auxiliary combustion chamber 2 through the discharge aperture 21 with the motion of the piston 6 down-stroked. As the residual gas is discharged, the majority of the rich air-fuel mixture issuing from the tip of the suction passage 10 in the auxiliary intake channel 4 is guided on the head 11a of the intake valve 11 to enter through the suction aperture 20 into the auxiliary combustion chamber 2. At this time, the separating wall 22 provided in the auxiliary combustion chamber 2 serves to prevent the rich air-fuel mixture entering from the suction aperture 20 into the auxiliary combustion chamber 2 from directly flowing out through the discharge aperture 21, thus serving to improve the scavenging efficiency in the auxiliary combustion chamber 2 to ensure reliable and effective trapping of the rich mixture. In the subsequent compression stroke the intake valve 11 is closed, and with the piston 6 up-stroked the lean air-fuel mixture within the main combustion chamber 1 is compressed and partly intrudes through the suction and discharge apertures 20 and 21 into the auxiliary combustion chamber 2. Thus, the rich air-fuel mixture within the auxiliary combustion chamber 2 is adequately diluted as it is compressed. The air-fuel mixture within the auxiliary combustion chamber 2 is ignited by an ignition plug 23, and the resultant flame flows out through the suction and discharge apertures 20 and 21 and ignites and combusts the lean air-fuel mixture within the main combustion chamber 1 which cannot be ignited by the ordinary spark discharge. The subsequent operation is similar to what takes place in the ordinary internal combustion engine. The lean and rich air-fuel mixtures are heated by the exhaust gas within the exhaust manifold 17, whereby the gasification of the fuel is achieved. Also, the rich air-fuel mixture, having been heated by the exhaust gas, is adequately cooled to an adequate temperature by cooling water. In this way, while promoting the gasification of the fuel, excessively high temperature of the rich air-fuel mixture entering the auxiliary combustion chamber 2 is prevented.

The carburetor according to the invention is mounted on the intake manifold 9 of the stratified internal combustion engine, and it supplies lean air-fuel mixture to the main intake channel 3 and rich air-fuel mixture to the auxiliary intake channel 4. Some preferred embodiments of the carburetor according to the invention will now be described.

Figure 2:
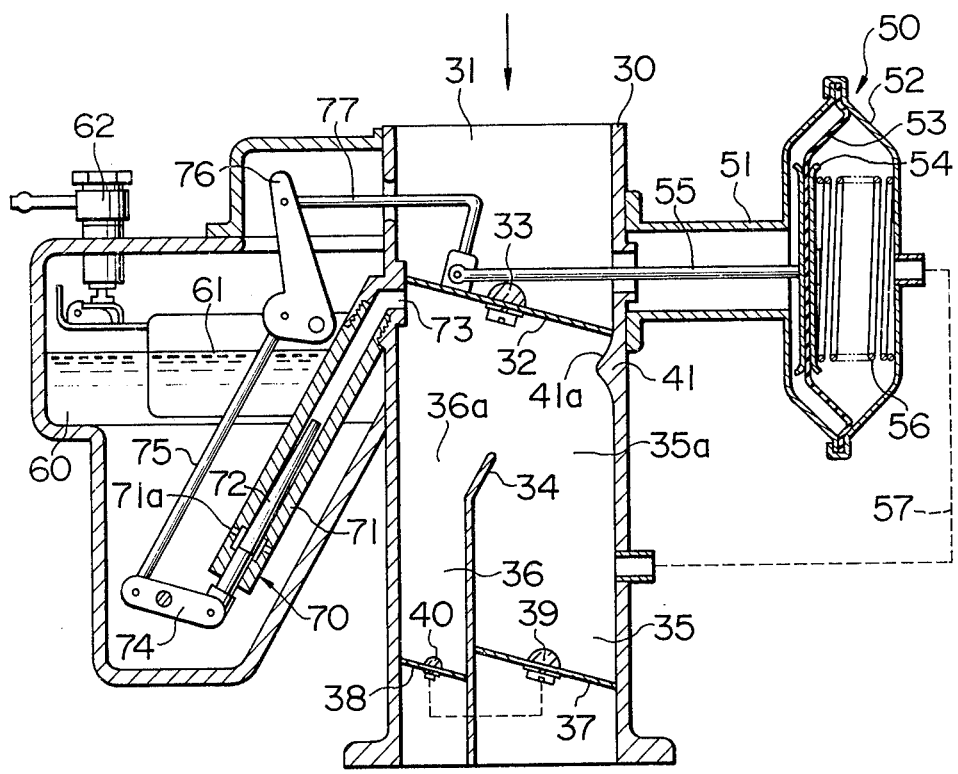
FIG. 2 is a sectional view showing a first embodiment of the carburetor according to the invention.

FIG. 2 shows a first embodiment of the invention. Reference numeral 30 designates a carburetor body forming an air horn 31 of a circular sectional profile. The carburetor body 30 is provided at an upper portion thereof with an air valve 32 which is an elliptical disc and is rotatably mounted via a shaft 33 secured thereto along a short axis of the elliptical disc. The carburetor body 30 is provided at a lower portion thereof with a partition wall 34, which defines main and auxiliary ducts 35 and 36 branching from the air horn 31 at the downstream of the air valve 32, these ducts extending parallel to each other and individually having circular sectional profiles. The top ends of the main and auxiliary ducts 35 and 36 where they branch from the air horn 31, are respectively indicated at 35a and 36a. An upstream portion of the partition wall 34 is slanted toward the side of the main duct 35. Main and auxiliary throttle valves 37 and 38 each consisting of an elliptical disc are disposed within the respective main and auxiliary ducts 35 and 36. They are rotatably mounted via their respective shafts 39 and 40 in the carburetor body 30 and are ganged to each other, and their opening is controlled by operating an accelerator pedal not shown. Numeral 41 designates an air shut-off lobe provided on the inner wall of the air horn 31 immediately at the downstream of the air valve 32 and directly above the main duct 35. This air shut-off lobe 41 has a shut-off face 41a of an arcuate profile corresponding to the orbit of the associating end of the air valve 32 drawn with the rotation thereof such that it shuts off air flow on its side until the air valve 32 is rotated beyond a predetermined opening degree. Thus, when the air flow rate is low, air is permitted only on the side opposite the lobe 41. Numeral 50 designates a diaphragm unit which comprises a housing 51, a cover 52, a diaphragm 53 with the periphery thereof clamped between housing 51 and cover 52, a rod 55 having an end secured together with a spring seat 54 to the center of the diaphragm 53 and a compression spring 56 provided between cover 52 and spring seat 54. The rod 55 has its other end linked to the air valve 32 such that the opening of the air valve 32 is varied with its displacement. As the drive source to cause the displacement of the rod 55 by driving the diaphragm 53 in the diaphragm unit 50, the negative pressure which is produced between the air valve 32 in the air horn 31 and main or auxiliary throttle valve 37 or 38 in the main or auxiliary duct 35 or 36 is used (in the instant embodiment the negative pressure produced in the main duct 53 upstream of the main throttle valve 37). This negative pressure is lead through a duct 57 to a compartment defined between cover 52 and diaphragm 53. With increase in the negative pressure the aperture of the air valve 32 is increased by the diaphragm 53 and rod 55. Numeral 60 designates a float bowl where the fuel is stored, 61 a float, and 62 a nipple. The fuel is supplied through the nipple 62 into the float bowl, and the fuel level in the float bowl 60 is held constant by the co-operation of the float 61 and a needle valve (not shown) in the nipple 62. Numeral 70 designates a main fuel jet which comprises a fuel jet tube 71, a needle valve 72 fitted therein for back-and-forth movement within the fuel jet tube 71 and a fuel nozzle 73. The needle valve 72 is coupled to the air valve 32 through a linkage consisting of a lever 74, a rod 75, a lever 76 and a rod 77 for the aforementioned back-and-forth movement according to the rotation of the air valve 32. With its back-and-forth movement it calibrates fuel in co-operation with the fuel jet tube 71. The fuel jet tube 71 is provided with a passage 71a communicating with the float bowl 60. The fuel nozzle is open immediately downstream the air valve 32 and right above the upstream end 36a of the auxiliary duct 36 (this position of the opening being also on the side opposite the air shut-off lobe 41). The fuel calibrated by the fuel jet tube 71 and needle valve 72 is sprayed from the fuel nozzle 73 as the atomized particles into the air stream in the air horn 31. While only the main fuel jet 70 is shown here, an idle jet and a low-speed jet may, if necessary, be also provided as in the ordinary carburetor.

When the carburetor of the above construction is installed in the stratified internal combustion engine as shown in FIG. 1, the main duct 35 communicates with the main intake channel 3, and the auxiliary duct 36 communicates with the auxiliary intake channel 4. Thus, the quantity of the air-fuel mixtures supplied to the respective main and auxiliary intake channels 3 and 4 of the engine is controlled according to the opening of the throttle valves 37 and 38. Also, the rate of air flow through the air horn 31 determines the opening degree of the air valve 32. This is because the opening degree of the air valve 32 is controlled by the diaphragm unit 50, which receives the negative pressure between the air valve 32 in the air horn 31 and the throttle valve 37 or 38 in the main or auxiliary duct 35 or 36 (this negative pressure being related to the rate of air flow). The fuel within the float bowl 60 which is held at a constant level by the float 61 and nipple 62 is calibrated according to the opening degree of the air valve 32 by the action of the fuel jet constituted of the fuel jet tube 71 and needle valve 72 to be drawn out from the fuel nozzle 73 into the air horn 31 immediately at the downstream of the air valve 32 and atomized by the air stream passing through the gap between the inner wall of the air horn 31 and air valve 32 as it is mixed with the air stream.

The fuel thus sprayed into the air stream does not immediately form a homogenious air-fuel mixture, but it is mixed much more with the air on the nozzle side and very little with the air on the opposite side. This means that with the above construction where the fuel nozzle 73 is open right above the auxiliary duct 36, the sprayed fuel is mixed much more with the air flowing into the auxiliary duct 36, but it is mixed very little with the air flowing into the main duct 35. As a result, the air-fuel mixture collected in the auxiliary duct 36 is rich in fuel, while that collected in the main duct 35 is lean. It will thus be appreciated that the carburetor of the construction can provide both rich and lean air-fuel mixtures to supply the rich mixture to the main intake channel 3 and the lean mixture to the auxiliary intake channel 4. Besides, the above carburetor needs only a single fuel system for both lean and rich air-fuel mixtures, so that its construction is simplified. Further, the over-all air-fuel ratio of the sum of the lean and rich air-fuel mixtures can be set by merely adjusting the relation between the fuel jet 70 constituting the sole fuel system, particularly needle valve 72, and the aperture of the air valve 32. Thus, it is possible to extremely simplify the adjustment and improve the precision thereof.

Moreover, with the provision of the air valve 32 and with the position of the opening of the fuel nozzle 73 of the fuel jet 70 located at the downstream of the air valve 32 and above the auxiliary duct 36 as mentioned earlier, the collection of the lean air-fuel mixture in the main duct 35 and the collection of the rich air-fuel mixture in the auxiliary duct 36 can be reliably and effectively obtained.

Figure 3:
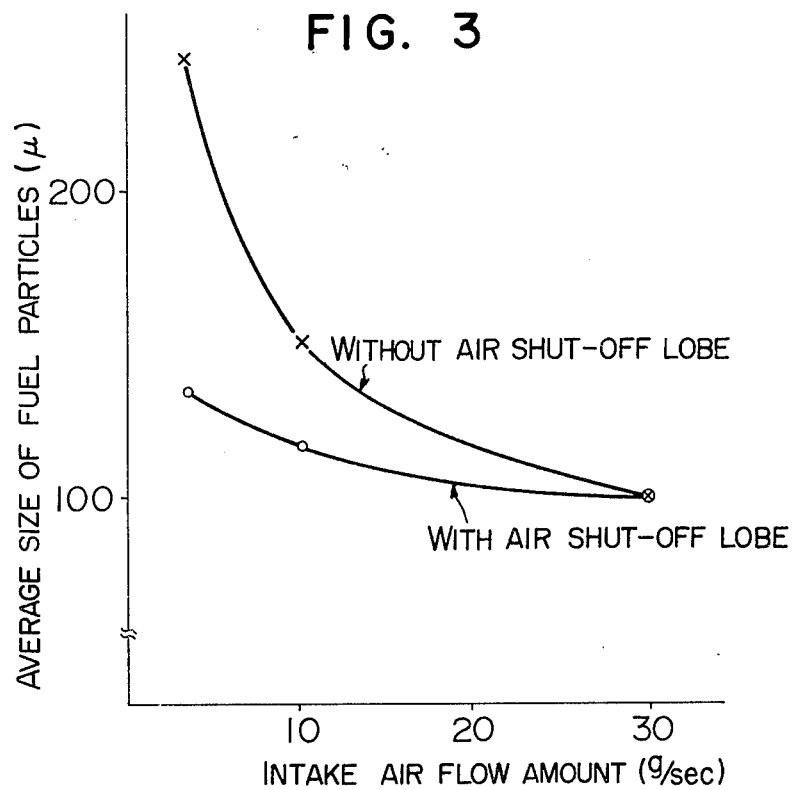
FIG. 3 is a graph showing a characteristic of the carburetor of FIG. 2.

The air shut-off lobe 41 provided in the air horn 31 contributes to the effective atomization of the fuel sprayed from the fuel nozzle 73. When the rate of air flow is low with small opening of the air valve 32, the air shut-off lobe 41 blocks air on its side, that is, air is permitted only on the opposite side, i.e., on the side of the fuel nozzle 73, so that the speed of air flowing at the opening of the fuel nozzle 73 is increased that much. Consequently, the atomization of the fuel from the fuel nozzle 73 is enhanced. When the opening of the air valve 32 is increased beyond a predetermined degree with the increase of the air flow rate, the air speed is sufficiently increased to obtain sufficient atomization of the fuel. At this time, the air begins to be permitted also on the side of the air shut-off lobe 41, and with further increase of the air valve opening degree the air flow on this side is increased. FIG. 3 shows experimental data to exhibit the effect of the air shut-off lobe 41. In this experiment, the average size of the atomized particles of the fuel supplied from the fuel nozzle 73 was measured for various amounts of air flow with the over-all air-fuel ratio set to 15 and the negative pressure in the ducts between the air valve 32 and the throttle valves 37 and 38 set to −40 mm Hg. It will be seen from the data that the average particle sizes of both the carburetor with the air shut-off lobe and without any air shut-off lobe does not substantially differ to each other, when the amount of air flow is large (around 30 g/sec. in the instant experiment), but it differs greatly, when the air flow amount is small thus exhibiting the pronouced effect of the air shut-off lobe 41 on the atomization of the fuel.

The circular sectional profile of the air horn 31 and main and auxiliary ducts 35 and 36 are not limitative, and other profiles such as a rectangular one may also be adopted as well.

Figure 4:
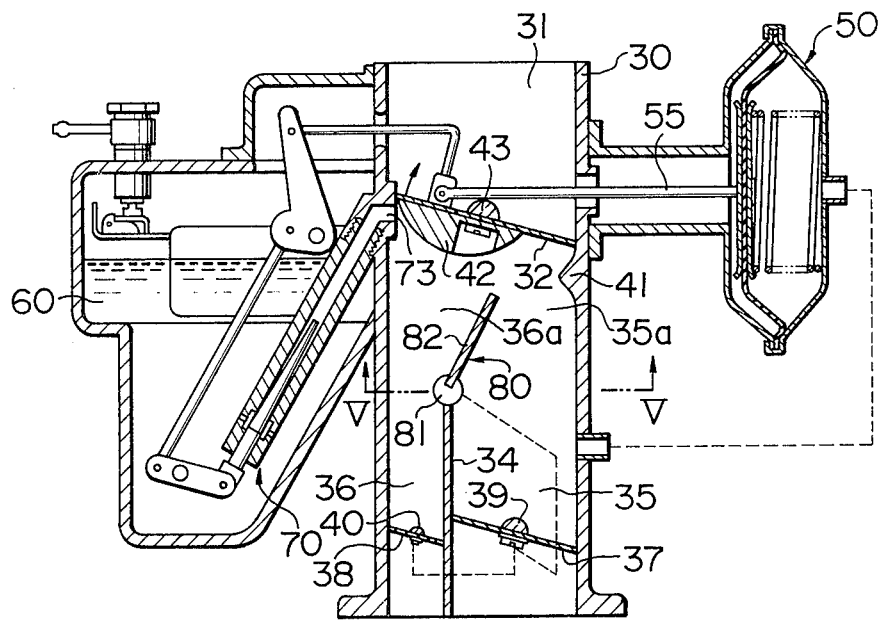
FIG. 4 is a sectional view showing a second embodiment of the carburetor according to the invention.
Figure 5:
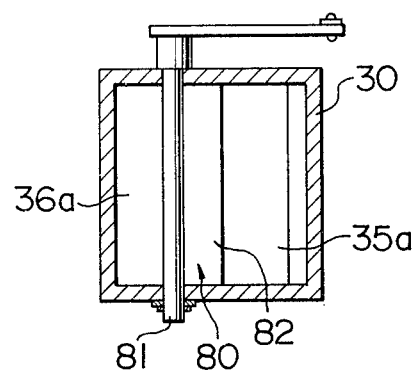
FIG. 5 is a sectional view taken along line V—V in FIG. 4.
Figure 6:
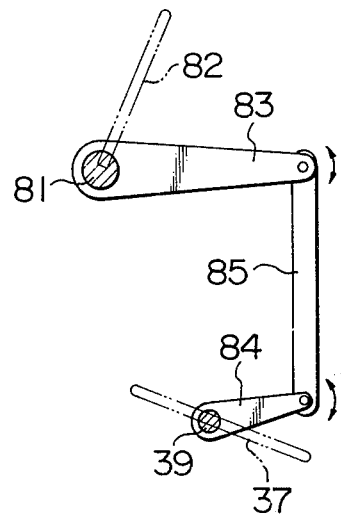
FIG. 6 is a view showing an example of the linkage between a duct area control means and a throttle valve.

FIGS. 4 to 6 show the second embodiment of the invention. This embodiment is similar to the preceding embodiment except that it is provided with an air valve adapter and duct area control means.

Designated at 42 is the air valve adapter, which is screwed by a bolt 43 to the downstream side of a portion of the air valve 32 in the proximity of the open end of the fuel nozzle 73. The adapter 42 has a curved surface of an arcuate profile, so that the area of the throttled air passage defined between it and the inner wall of the air horn 31 varies continuously in the direction of the air flow. Also, the area of the passage is minimum in the vicinity of the open end of the fuel nozzle 73. This air valve adapter 42 has an effect of minimizing the pressure loss between the upstream and downstream sides of the air valve 32, thus maintaining high air speed to thereby promote the atomization of fuel. This effect may also be obtained by using an air valve having a contour similar to the adapter instead of securing the adapter 42 to the air valve 32. Designated at 80 is the duct area control means. It is provided to vary the sectional area ratio between the upstream ends 35a and 36a of the main and auxiliary ducts 35 and 36, and it consists of a shaft 81 and a collector 82. The shaft 81 is rotatably supported in the carburetor body 30 and adjacent to the upstream end of the partition wall 34 defining the main and auxiliary ducts 35 and 36. The collector 82 has its one side secured to the shaft 81. Desirably, in this zone the air horn 31 and main and auxiliary ducts 35 and 36 respectively have rectangular sectional profiles, and the collector 82 has a rectangular shape corresponding to the sectional profile of the air horn in this zone. With the rotation of the shaft 81 the collector 82 rotates on the shaft 81 in the clockwise or counterclockwise direction in FIG. 4, whereby the sectional area ratio between the upstream ends 35a and 36b of the main and auxiliary ducts 35 and 36 is varied. The shaft 81 is ganged to the shaft 39 of the main throttle valve 37 provided in the main duct 35. FIG. 6 shows an example of this linkage. In this example, the shaft 81 is secured to one end of a lever 83 while the shaft 39 of the throttle valve 37 is secured to one end of another lever 84, and the other ends of these levers are linked to the opposite ends of a rod 85. With the shaft 81 and main throttle valve shaft 39 ganged together through this linkage, the rotation of the lever 84 in unison with the throttle valve 37 is transmitted through the rod 85 to the lever 83 to cause the rotation of the shaft 81 and, hence, the rotation of the collector 82. Here, the collector 82 is rotated in proportion to the rotation of the throttle valve 37, and the angular displacement ratio between the levers 83 and 84 may be varied by varying the lever ratio. With this arrangement of the collector 82 adapted to be rotated in an interlocked relation to the rotation of the throttle valve 37, the sectional area ratio between the branching ends 35a and 36a of the main and auxiliary ducts 35 and 36 can be controlled according to the rate of flow of the taken-in air.

It is also possible to arrange such that the collector 82 (i.e., shaft 81) can be manually rotated independently of the air flow; in this case a wire or a lever may be used. Further, instead of coupling to the main throttle valve 37, it is possible to couple the collector 82 to the auxiliary throttle valve 38 in the auxiliary duct or to the air valve 32 for rotation according to the intake air flow. In case where the collector 82 is coupled to the air valve 32, the intake air flow rate may be more directly followed compared to the case where the collector is coupled to the throttle valve 37 or 38. Furthermore, it is possible to arrange such that the shaft 81 (and collector 82) is rotated in a non-linear relation to the rotation of the throttle valve 37 or 38 or air valve 32. This may be achieved by incorporating a cam or tappet in the aforementioned linkage.

While the carburetor according to the invention utilizes the non-uniform distribution of fuel sprayed from the fuel nozzle into the air stream in order to collect lean air-fuel mixture in the main duct and rich air-fuel mixture in the auxiliary duct, the degree of non-uniformity of the air-fuel mixture formed as the fuel is sprayed into the air stream differs with the opening of the air valve 32. When the air flow rate is low with the air valve 32 nearly fully closed, the sprayed fuel will diffuse widely, so that the afore-said degree of non-uniformity is low. However, with increase of the opening of the air valve 32 the extent of diffusion of fuel is restricted to increase the degree of non-uniformity.

Denoting now the ratio of the quantity of fuel collected in the auxiliary duct to the total quantity of the sprayed fuel by $\lambda f$, it is given as $$\lambda f = \eta \alpha T/\alpha S \cdot \lambda a \tag{1}$$

where $\eta$ is an index representing the efficiency with which fuel is collected in the auxiliary duct 36. This index is greatly influenced by As/(Am + As) where Am is the sectional area of the upstream end 35a of the main duct 35 and As is the sectional area of the upstream end 36a of the auxiliary duct 36, that is, it greatly depends upon the ratio of the sectional area of the upstream end 36a of the auxiliary duct to the total sectional area.

$\alpha$s represents the air-fuel ratio of the air-fuel mixture collected in the auxiliary duct 36, and $\alpha$T the over-all air-fuel ratio of the air-fuel mixture collected in the main and auxiliary ducts 35 and 36. As mentioned earlier, the air-fuel ratio $\alpha$S for the auxiliary duct 36 greatly depends upon the opening of the air valve 32, that is, rate of air flow (intake air flow) Ga in the air horn 31. $\lambda$a is given as $$\lambda a = Gs/Gm + Gs$$

where Gm is the amount of flow of air-fuel mixture in the main duct 35, and Gs is the amount of flow of air-fuel mixture in the auxiliary duct 35.

While $\lambda$f is a significant factor for effectively achieving the stratified combustion in the stratified internal combustion engine, $\alpha$s/$\alpha$T greatly varies with Ga since $\alpha$s varies with Ga. Accordingly, in order to be able to maintain $\lambda$f required by the engine, $\eta$ or a has to be varied to extents sufficient to compensate for great changes of $\alpha$s/$\alpha$T. Assuming now that $\eta$ is constant, that is, the sectional areas of the upstream ends 35a and 36a of themmain and auxiliary ducts 35 and 36 are constant, the variations of $\alpha$s/$\alpha$T has to be compensated for by varying the sole $\lambda$a. The control for varying $\lambda$a over a wide range, however, is usually difficult in actual practice.

With the carburetor of the above construction having the duct area control means 80, the value of As/Am, that is, the value of As/(Am + As), can be varied by the operation of the control means 80. Thus, it is possible to vary not only the value of $\lambda$a but also the value of $\eta$ in equation 1, thus enabling the control for varying $\eta$ over a wide range. This means that it is possible to well compensate $\lambda$f required by the engine for large variations of $\alpha$s/$\alpha$T for collecting the proper amount of fuel in the auxiliary duct 36 to ensure reliable stratified combustion in the engine.

Besides, this excellent effect can be obtained by merely providing the duct area control means 80 of a simple construction consisting of the shaft 81 rotatably supported in the air horn 1 and the collector 82 secured to the shaft 81 and without leading to substantial complication of the over-all construction.

As has been mentioned earlier, where the variations of $\alpha$s/$\alpha$T is compensated for by the duct area control means 80 it is effective to arrange such that the shaft 81 is rotated according to the opening of the throttle valve 37 or 38 or air valve 32. This is because the opening of the throttle valve 37 or 38 or air valve 32 determines the rate of intake air flow. This means that As(Am + As), i.e., $\eta$, can be controlled according to the amount of the intake air flow Ga, thus permitting reliable and accurate compensation for $\alpha$s/$\alpha$T varying with Ga. In case of the arrangement to follow the opening of the air valve 32, the amount of the intake air flow is directly followed, so that the most reliable and accurate control is possible.

The duct area control means 80 may also serve, in addition to the above function, to compensate for, for instance, variations in temperature and atmospheric pressure. Even if $\lambda$f is controlled to a standard value according to $\lambda$a, it is likely to depart from the requisite value with a change of temperature or atmospheric pressure. At this time, As(Am + As) may be varied to vary $\eta$ so as to maintain $\lambda$f at the requisite value. In this case, the shaft 81 may be coupled to a diaphragm unit adapted to operate in response to changes in atmospheric pressure or to a member extensible with changes in the atmospheric temperature or temperature of the engine cooling water.

The above duct area control means 80 may be applied, not only to the carburetor provided with an air valve as in the preceding embodiment, but it may also be applied to a carburetor without an air valve as such as the following embodiments to obtain similar effects.

Figure 7:
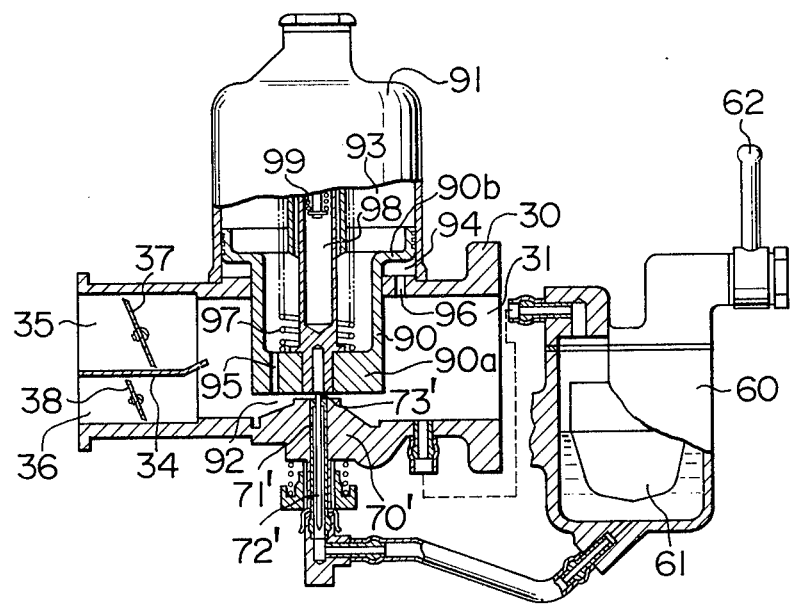
FIG. 7 is a sectional view showing a third embodiment of the carburetor according to the invention.

FIG. 7 shows a third embodiment of the invention. In this embodiment, a suction piston is provided in the air horn. Designated at 90 is the suction piston, which is mounted in the carburetor body 30 and extends into the air horn 31 at the upstream of the branching ends of the main and auxiliary ducts 35 and 36. It consists of a head 90a disposed within the air horn 31 and a skirt 90b penetrating the carburetor body 30. The head 90a extends across the air horn 31, and the skirt 90b is slidably fitted in an outer cylindrical cover 91 secured to the outer side of the carburetor body 30. As the skirt 90b of the suction piston 90 slides within the cover 91, the head 90a is displaced back and forth across the air horn 31, that is, in a direction perpendicular to the axis of the horn. The end of the head 90a of the suction piston 90 forms a variable venturi with the corresponding inner wall of the air horn 31; the sectional area of the venturi 92 varies with the displacement of the suction piston 90. The interior of the cover 91 is divided by the suction piston 90 into two sections 93 and 94. The upper section 93 in the Figure (hereinafter referred to as suction chamber) is communicated with the variable venturi 92 via a suction hole 95 formed in the head 90a of the piston 90. The other section 94 (hereinafter referred to as the atmospheric chamber) is communicated with the air horn 31 at the upstream of the venturi 92 via a hole 96 formed in the carburetor body 30. Thus, the negative pressure at the venturi is led to the suction chamber 93, while the atmospheric pressure is led to the atmospheric chamber 94. With this arrangement, the afore-mentioned back-and-forth movement of the suction piston 90 is brought about with a change in the difference between the two pressures or practically the negative pressure at the venturi 92. The negative pressure at the venturi 92 is related to the amount of air flow in the air horn 31 as is well known in the art. A compression spring 97 provided between the suction piston 90 and the top of the cover 91 provides a spring force acting against the negative pressure in the suction chamber 93. A damper mechanism comprising a damper cylinder 98 secured to the suction piston 90 and a damper 99 fitted in the damper cylinder 98 and secured to the cover 91 serves to prevent sudden movement (particularly retreat) of the suction piston 90.

A main fuel jet 70' is constituted by a fuel jet tube 71', a needle valve 72' fitted in the fuel jet tube 71' and a fuel nozzle 73'. The needle valve 72' has its upper end in the Figure coupled to the head 90a of the suction piston 90 so that it can be moved back and forth within the fuel jet tube 71' with the movement of the suction piston 90, to thereby effect the metering of the fuel. The upper end of the fuel jet tube 71' is open to the air horn 31 at the venturi 92, and the gap between its open end and the needle valve 72' constitutes the fuel nozzle 73'. The upstream end of one of the ducts 35 and 36 branching from the air horn 31, namely auxiliary duct 36, is disposed right at the downstream of the venturi 92.

With the above construction, the position of the suction piston 90 within the air horn 31, and hence the sectional area of the venturi 92, is determined by the amount of air flow in the air horn 31. This is so because the position of the suction piston 90 is controlled according to the negative pressure at the venturi 92 and led to the section chamber 93. The fuel in the float bowl 60 is calibrated according to the position of the suction piston 90 by the co-operation of the fuel jet tube 71' and needle valve 72', and the calibrated fuel is sprayed into and atomized by the air stream through the venturi 92.

Similar to the case of the first embodiment, here the lean and rich air-fuel mixtures are collected respectively in the main and auxiliary ducts 35 and 36.

Figure 8:
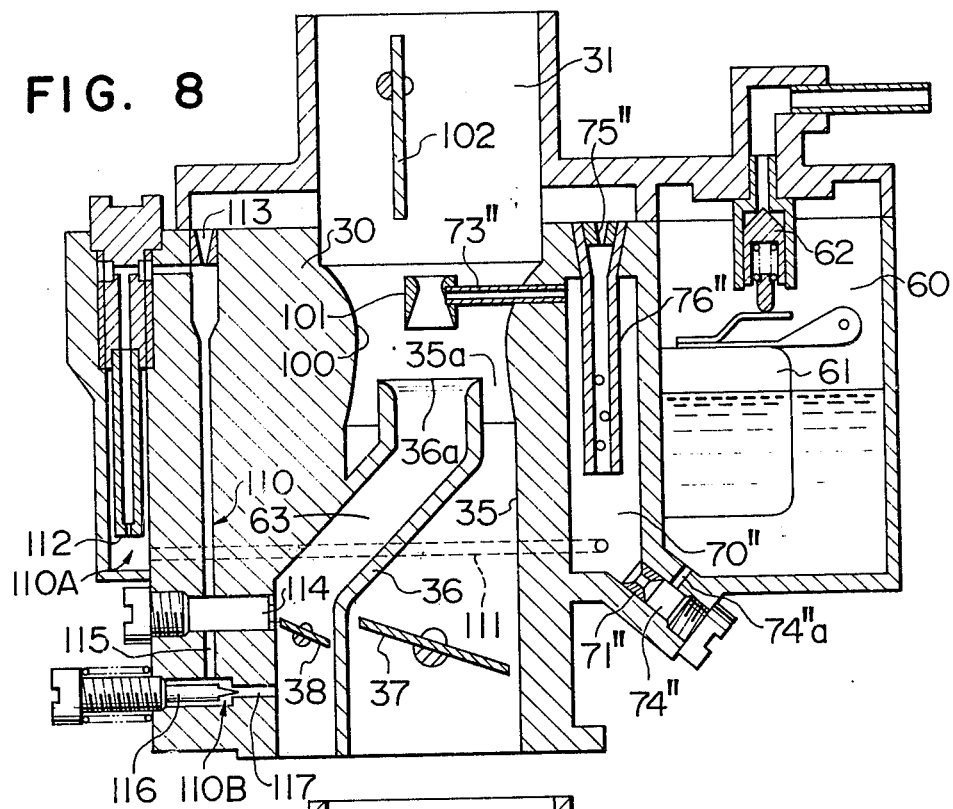
FIG. 8 is a sectional view showing a fourth embodiment of the carburetor according to the invention.

FIG. 8 shows a fourth embodiment of the invention. In this embodiment, fixed venturies are provided in the air horn, and also an auxiliary fuel jet is provided in the auxiliary duct. The auxiliary fuel jet consists of a slow-speed jet for delivering fuel under low-load engine operating conditions and an idle jet for delivering fuel under non-load engine operating conditions.

Designated at 100 is a venturi formed in an intermediate portion of the air horn 31, and at 101 a small venturi disposed in and concentric with the large venturi 100. These venturies are fixed venturies for measuring the air flow. A portion of the air horn 31 at the downstream of the venturi 100 constitutes the main duct 35. The auxiliary duct 36 has a downstream portion extending parallel to the main duct 35 and a slanted upstream portion extending into the main duct 35, and its upstream end 36a is concentric with the upstream end 35a of the main duct 36 and is disposed right at the downstream of the small venturi 101. Designated at 102 is a choke valve. Designated at 70" is a main fuel jet including a fuel jet 71", fuel nozzle 73", a fuel passage 74", an air jet 75" and an air bleed tube 76". The fuel passage 74" is communicated with the bottom of the float bowl 60 via a passage 74"a, and the fuel nozzle 73" has an end open to the small venturi 101. In this main fuel jet 70", the fuel in the float bowl 60 is led through the passages 74" and 74"a to the fuel jet 71", and the fuel calibrated through the fuel jet 71" is mixed with appropriately calibrated air supplied through the air jet 75" and air bleed tube 76". The resultant mixture is led to the main fuel nozzle 73" and is sprayed from the opening thereof at the small venturi 101 into the air stream in the small venturi 101. Designated at 110 is an auxiliary fuel jet. It consists of a low-speed jet section 110A and an idle jet 110B. The low-speed jet 110A includes a fuel passage 111, a low-speed jet 112, an economizer 113 and a port 114. The fuel passage 111 branches from the fuel passage 74" at the downstream of the main fuel jet 71", and the port 114 is open to the auxiliary duct 36 at a position slightly upstream the auxiliary throttle valve 38 in the fully closed position thereof. In the low-speed jet 110A, the fuel is introduced through the fuel passage 74" into the fuel passage 111 for calibration through the low-speed jet 112. The fuel from the low-speed jet 112 is mixed with air introduced from the economizer 113, and the resultant mixture is sprayed from the low-speed port 114 into the auxiliary duct 36. The delivery of the fuel from the low-speed jet 110A is effected at the time of the low-load operation of the engine. Since the low-speed port 114 is open to the auxiliary duct 36 at a position slightly upstream of the auxiliary throttle valve 38 in the fully closed position thereof, the area of its opening and pressure thereat vary according to the opening of the auxiliary throttle valve 38, whereby a proper amount of fuel is adapted to be sprayed from it into the stream of air entering the auxiliary duct 36. At the time of the low-load operation of the engine, at which time the low-speed jet 110A delivers fuel, the main jet section 70" is adapted to deliver no fuel or little fuel, and as the engine load increases the main jet 70" gradually replaces the low-speed jet 110A in taking the role of fuel delivery. The idle jet 110B branches from an intermediate portion of the low-speed fuel passage 111 in the low-speed jet 110A similar to the well-known construction. The idle jet 110B consists of an idle fuel passage 115 branching from the low-speed fuel passage 111, an adjustment screw 116 and an idle port 117 open to the auxiliary duct 36 at the downstream of the auxiliary throttle valve 38. This jet takes fuel from the low-speed fuel passage 111 particularly at the time of the non-load operation of the engine, and the fuel thus taken is calibrated through the adjustment screw 116 and delivered from the idle port 117 for mixing with the air having passed through a narrow gap between the inner wall of the auxiliary duct 36 and throttle valve 38 in proper proportions.

The operation of the carburetor of this construction will now be discussed. The air entering the air horn 31 is calibrated as it passes through the venturi 100 and small venturi 101, so that a negative pressure corresponding to the amount of air flow is produced at the open end of the main fuel nozzle 73" open to the small venturi 101. On the other hand, the amount of fuel flow in the main fuel jet 70" is determined by the throttle diameter of the main fuel jet 71" and throttle diameter of the air jet 75", and the calibration of fuel is effected according to the pressure at the open end of the main fuel nozzle 73". Consequently, the quantity of fuel delivered from the main fuel nozzle 73" is a function of the quantity of air entering the air horn 31. Thus, the calibrated fuel sprayed from the main fuel nozzle 73" into the air horn 73", more particularly the small venturi 101, is immediately atomized and mixed with the air passing through the small venturi. At this time, a homogenious air-fuel mixture is not immediately formed at the upstream ends 35a and 36a of the main and auxiliary ducts 35 and 36 disposed at the downstream of the small venturi 101, but the mixture formed thereat consists of two distinct layers, one rich in fuel and the other lean in fuel, the lean mixture being collected in the main duct 35 and the rich mixture collected in the auxiliary duct 36.

At the time of the medium or high load operation of the engine, at which time the amount of intake air flow is high with large openings of the main and auxiliary throttle valves 37 and 38, the main fuel jet 70" takes the role of fuel delivery for supplying proper air-fuel mixtures to the engine. Under the low-load or non-load engine operating conditions, however, substantially no fuel is delivered from the main fuel jet section 70" as mentioned earlier. At this time, the auxiliary fuel jet section 110 delivers fuel into the auxiliary duct 36. Consequently, lean mixture (or almost solely air) is supplied through the main duct 35, while a rich mixture is supplied through the auxiliary duct 36. At this time, the speed of air passing through the throttle valve 38 in the auxiliary duct 36, into which the majority of fuel is issued under the prevailing condition, is sufficiently high to achieve sufficient atomization of the fuel. Also, the rich air-fuel mixture produced here can be effectively supplied to the vicinity of the plug in the combustion chamber (not shown) communicating with the downstream end of the auxiliary duct 36.

Figure 9:
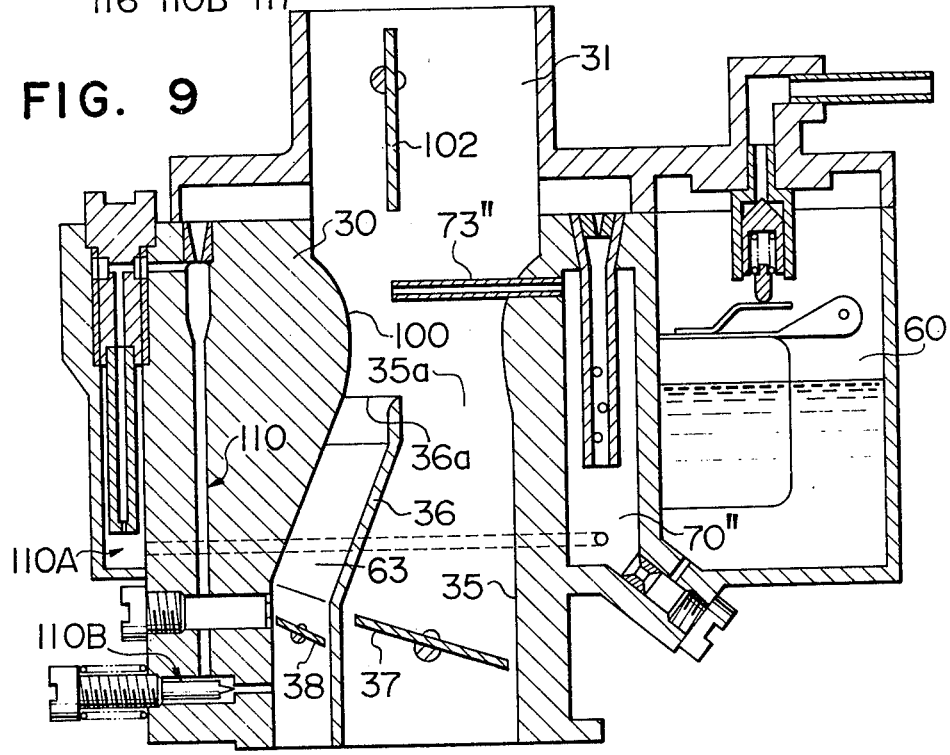
FIG. 9 is a sectional view showing a fifth embodiment of the carburetor according to the invention.

FIG. 9 shows a fifth embodiment of the invention. This embodiment is similar to the preceding embodiment except that the small venturi is dispensed with here.

Here, the open end of the main fuel nozzle 73" is disposed within the venturi 100 and right at upstream of the upstream end 36a of the auxiliary duct 36. Also, the upstream end 36a of the auxiliary duct 36 is disposed adjacent to the inner wall of the venturi 100, and correspondingly the open end of the main fuel nozzle 73" is not positioned at the center of the venturi 100 but is shifted towards the side of the auxiliary duct 36. This carburetor again permits lean air-fuel mixture to be collected in the main duct 35 and rich air-fuel mixture to be collected in the auxiliary duct 36 under the same principles as in the previous carburetor of FIG. 8.

Figure 10:
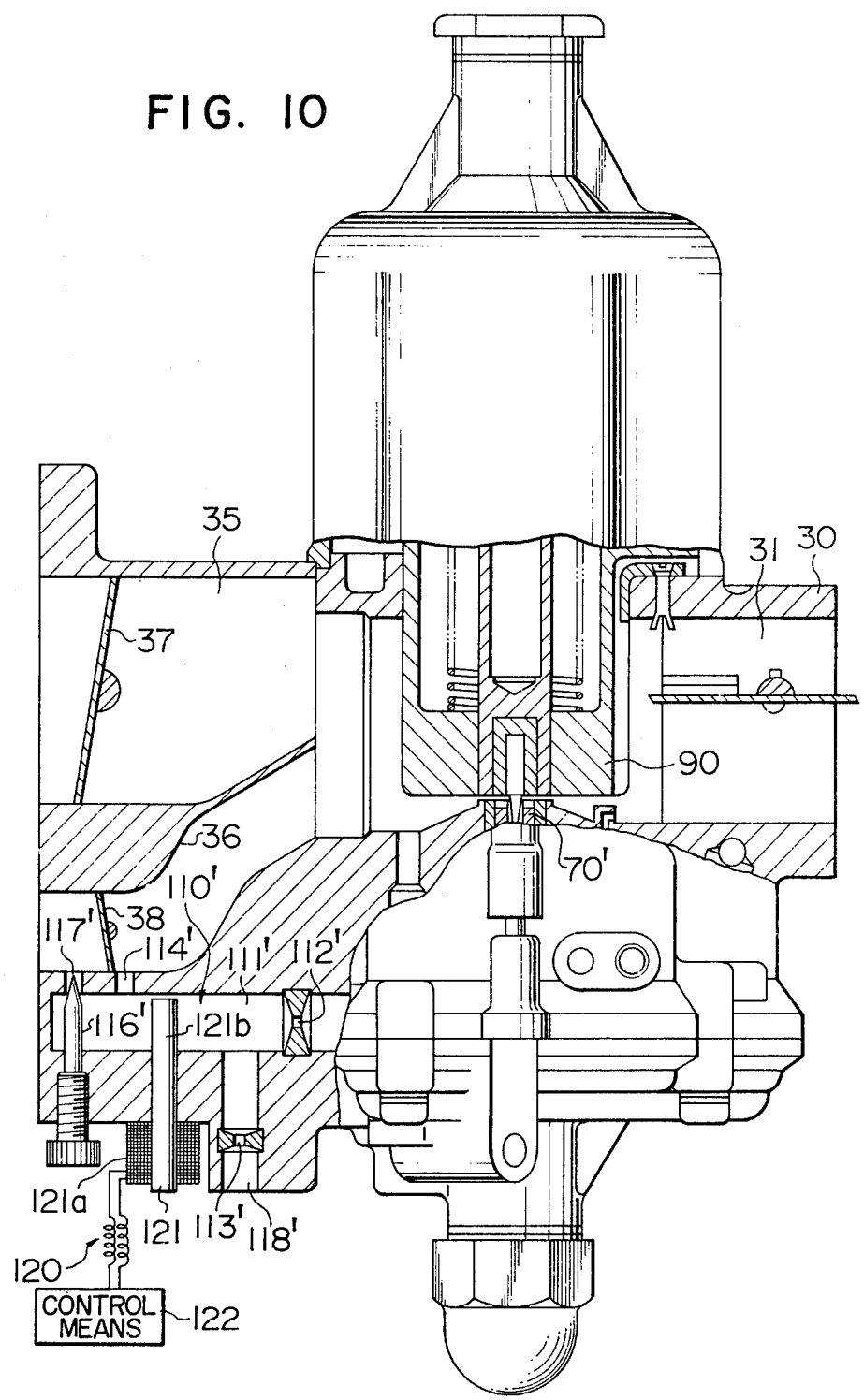
FIG. 10 is a front view, partly in section, showing a sixth embodiment of the carburetor according to the invention.

FIG. 10 shows a sixth embodiment of the invention. This embodiment is provided with an auxiliary fuel jet, and in which the supply of fuel from the auxiliary fuel jet is adapted to be cut at the time of suddenly closing the auxiliary throttle valve.

Figure 11:
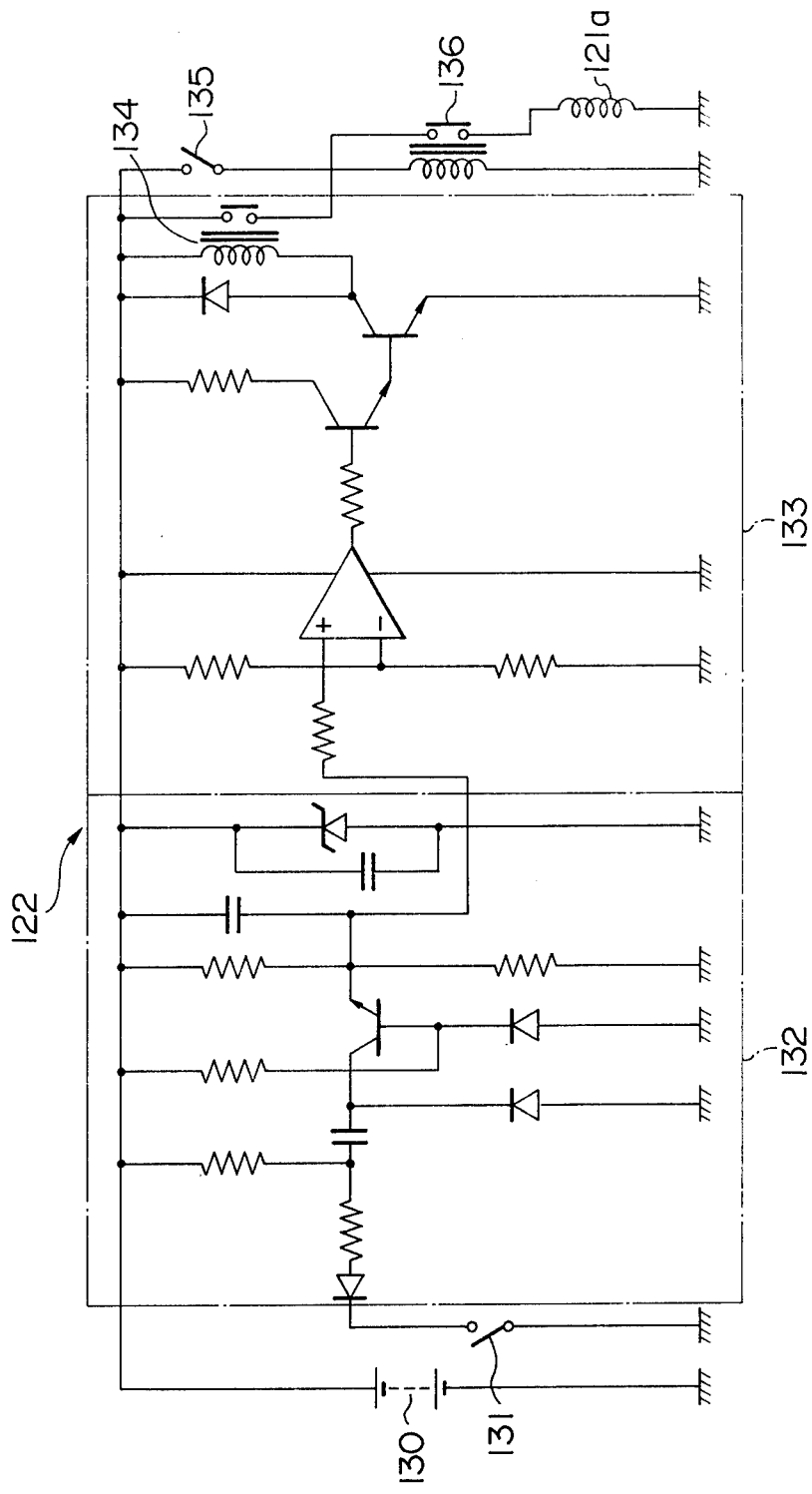
FIG. 11 is a circuit diagram showing an example of the control means shown in FIG. 10.

In this embodiment, the auxiliary fuel jet 110' includes a fuel passage 111', an idle port 117', a low-speed port 114', a fuel jet 112', an adjustment screw 116', an air passage 118' and an air jet 113'. Designated at 120 is a fuel cut-off means, which comprises an electromagnetic valve 121 having a coil 121a and a valve 121b and a control means 122 for controlling the electromagnetic valve 121. The valve 121b in the electromagnetic valve 121 is adapted to open and close the fuel passage 111' in the auxiliary fuel jet 110', and the control means 122 controls the energization of the coil 121a in the electromagnetic valve 121 to thereby let the valve 121b open or close the fuel passage 111'. More particularly, in such case when the auxiliary throttle valve 38 is suddenly brought to the fully closed position, the coil 121a of the electromagnetic valve 121 is energized to actuate the valve 121b, thereby closing the fuel passage 111' to cut the fuel supply from the auxiliary fuel jet 110'. In the automotive internal combustion engine, the throttle valve is suddenly broght to the fully closed position in such occasions as when suddenly decelerating the vehicle speed or when making a gear shift by depressing the clutch. In the instant embodiment, the control means 122 is adapted to energize the coil 121a of the electromagnet valve 121 at the time of depressing the clutch while the vehicle is running at a speed above a predetermined speed. FIG. 11 shows a specific example of the control means 122. In FIG. 11, designated at 130 is a battery, at 131 a switch on-off operated in synchronism to the operation of the engine for detecting the engine speed, at 132 a digital-analog converter for converting the frequency of on-off operation of the switch 131 into a corresponding value of voltage, at 133 a comparator for comparting the output voltage of the digital-analog converter with a reference voltage, at 134 a relay operated according to the output of the comparator 133, at 135 a clutch switch adapted to be closed to actuate the relay 134 when the clutch is depressed, and at 121a the afore-said electromagnetic valve coil. In this control means 122, the relay 134 is energized when the vehicle speed exceeds a predetermined speed, and the relay 136 is activated when the clutch switch 135 is closed with the depression of the clutch. When both the relays 134 and 136 are activated, power is supplied to the electromagnetic valve coil 121a. The afore-said predetermined vehicle speed is preferably about 8 km/h.

The above fuel cut-off means 120 serves to cut the supply of fuel from the auxiliary fuel jet 110' at such time as when the engine is suddenly decelerated and when making a gear shift at a high vehicle speed, thereby preventing the rich air-fuel mixture from becoming excessively rich in fuel. The usual carburator provided with a low-speed fuel jet has an inherent drawback in that the air-fuel mixture become excessively rich when the throttle valve is suddenly closed. This drawback is overcome with the above construction owing to the action of the fuel cut-off means 120.

By the way, the tendency of the air-fuel mixture to become excessively rich at the time of the sudden closure of the throttle valve is attributable to two causes, namely the delivery of fuel from the auxiliary fuel jet and evaporation of the fuel stagnant within the manifold due to sudden rise of the negative pressure within the manifold. To cope with these problems the use of a mixture control valve has heretofore been contemplated. The mixture control valve acts to detect the pressure within the manifold and permit air from a separate system into the manifold for a predetermined period from the detection of the sudden reduction of the pressure, to thereby dilute the excessively rich mixture within the manifold. The problem of the excessive enrichment of the mixture at the time of applying the engine brake or making a gear shift at a high vehicle speed can be practically solved by the use of the mixture control valve. However, as a result of extensive investigations concerning the tendency of the air-fuel mixture to become excessively rich, the inventors have found that a momentary over-rich state that cannot be covered with the mixture control valve is brought about in such occasion as when making a gear shift at high vehicle speed or applying the engine brake, and that this leads to the generation of harmful components in the exhaust gas. Even in such cases, the fuel cut-off means 120 of the above construction can reliably prevent the excessive enrichment of the mixture.

In the mean time, when the fuel cut-off means 120 is once actuated to cut fuel supply, fuel shortage and the like adverse results are prone at the time of the subsequent acceleration. Accordingly, it is not desirable to operate the fuel cut-off means 120 at the time of the low-speed operation of the engine, at which time the influence of the fuel shortage is serious. Under the low-speed engine operating conditions, the problem of the excessive enrichment of the mixture is usually less serious, and no problem will arise even if the supply of fuel from the auxiliary fuel jet is not stopped.

Figure 12:
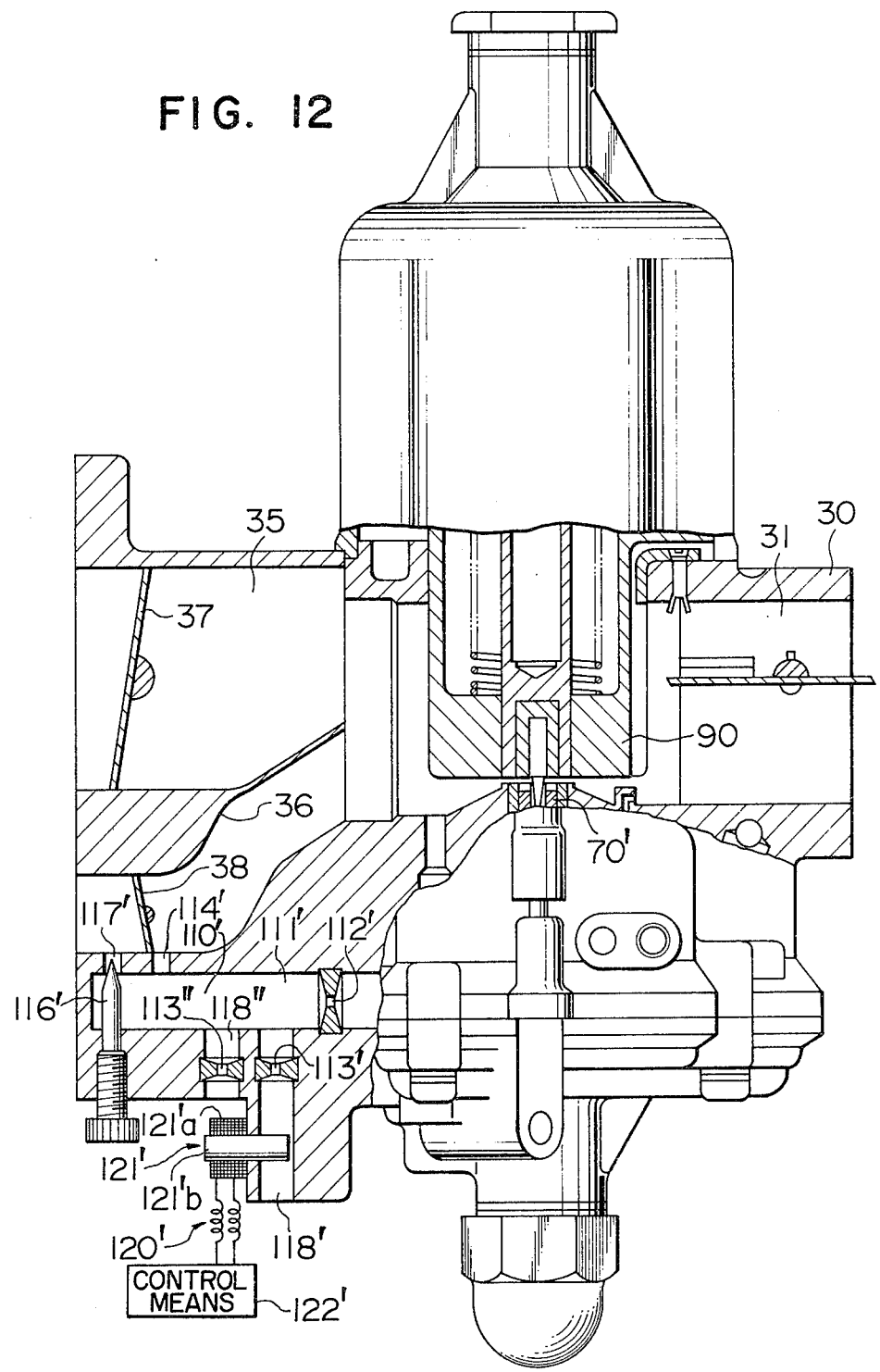
FIG. 12 is a front view, partly in section, showing a seventh embodiment of the carburetor according to the invention.

FIG. 12 shows a seventh embodiment of the invention. In this embodiment, a fuel cut-off means is operated to open and close an air passage in the auxiliary fuel jet to thereby control the fuel supply. More particularly, in the fuel cut-off means 120', the valve 121'b of the electromagnetic valve 121' is adapted to open and close the air passage 118'. While the energization of the coil 121a' of the electromagnetic valve 121' is controlled by the control means 122', the electromagnetic valve 121' or control means 122' here is designed such that the air passage 118' is opened when the throttle valve 38 is suddenly closed. This may be achieved by using as the control means 122' the one shown in FIG. 11 and as the electromagnetic valve 121' one whose valve is adapted to be opened when it is activated. In this embodiment, an air passage 118" provided with an air jet 113" is provided separately of the air passage 118', which is opened and closed by the fuel cut-off means 120'.

The operation of this embodiment is substantially the same as the operation of the preceding sixth embodiment except for the operation of the fuel cut-off means 120'. At the time of the sudden closure of the throttle valve 38, the fuel cut-off means 120' opens the air passage 118'. As a result, air is introduced through the idle and low-speed ports 117' and 114' to cut fuel. At this time, the quantity of air introduced is small by virtue of the air jets 113' and 113", and this will hardly give rise to subsequent engine troubles.

When the fuel passage is directly opened and closed as in the previous sixth embodiment, although the response in cutting and resuming the fuel supply is fast, the seal in the electromagnetic valve 121 is more important, and also increased drive force is required to overcome the increased frictional force, leading to added complications in construction. Further, the length of the fuel passage 111' has to be increased for installing the electromagnetic valve 121, and also the electromagnetic valve 121 has to be installed directly on the carburetor body 30. This implies difficulties that are liable to be encountered from the standpoint of the space factor. In contrast, in the seventh embodiment, although there is a slight sacrifice in the response, the above shortcomings in construction and installation are eliminated.

While in the preceding embodiments the auxiliary fuel jet has consisted of the idle and lowspeed jets according to the invention the auxiliary fuel jet may consist of only one of these two jets as well.

Further, while the service or role of the fuel cut-off means 120 or 120' has been to act at the time of sudden deceleration of the engine or at the time of a gear shift at high speed, that is, to prevent the excessive enrichment of the air-fuel mixture, this fuel cut-off means 120 or 120' may also be used as means for preventing the running-on of the engine. In this case, it may be adapted to be actuated when stopping the engine, or more particularly upon switching of the key switch of the engine to the stop position, thereby to cut the fuel supply from the auxiliary fuel jet 110' under the afore-mentioned principles. Also in this case, with the construction as that of FIG. 10 where the fuel passage is directly closed, the electromagnetic valve 121 may be designed such that the passage 111' is closed in the inoperative state of the coil 121a and is opened upon energization of the coil. With this arrangement, the electromagnetic valve 121 may be on-off controlled according to the switching of the key switch between the stop position and run position (inclusive of the stage of the engine start). On the other hand, with the construction as that of FIG. 12 where the air passage is on-off controlled, the electromagnetic valve 121' may be designed such that the passage 118 is open in the inoperative state of the electromagnetic valve 121' and is closed upon energization thereof, and it may be similarly controlled according to the switching of the key switch.

Figure 13:
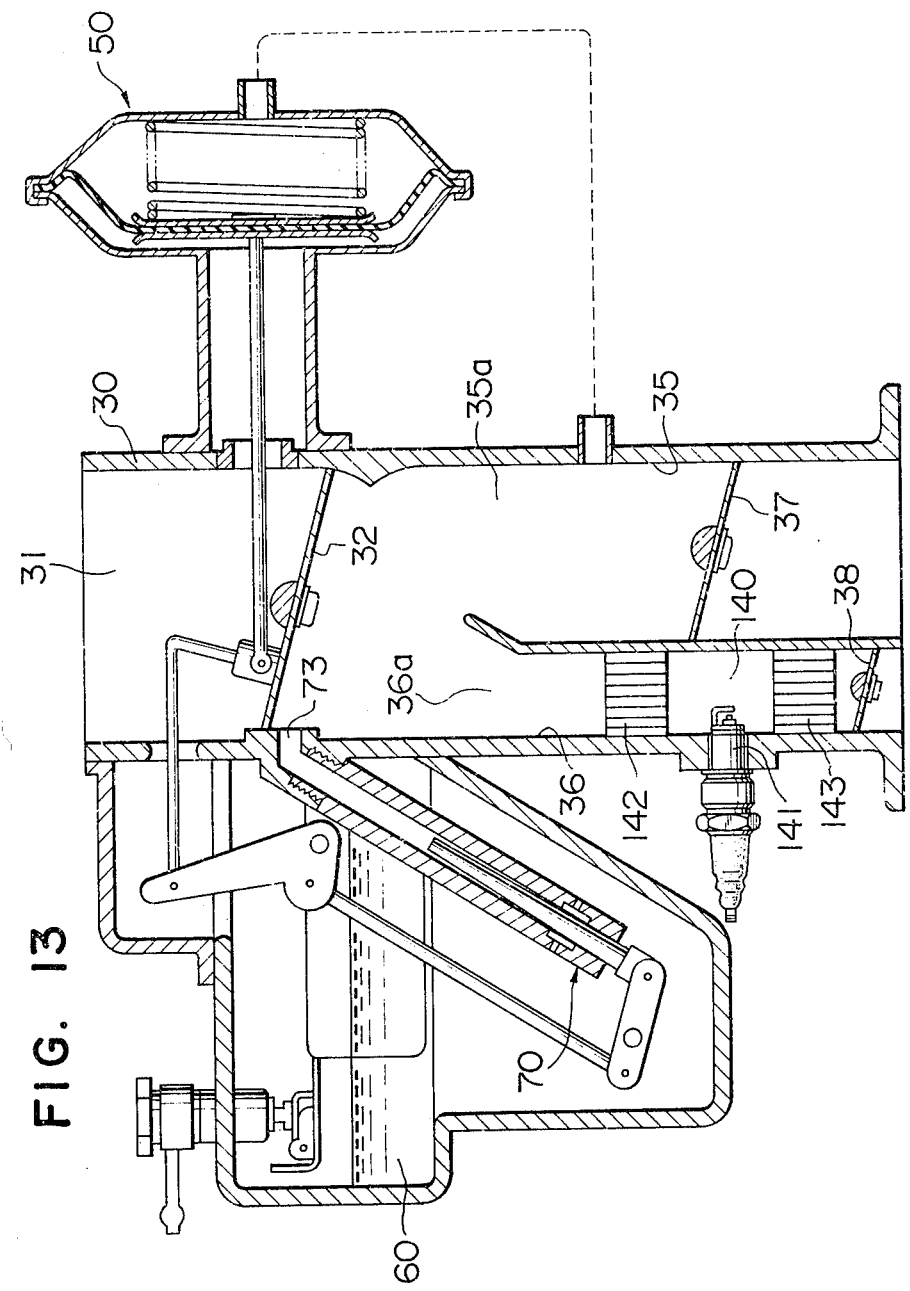
FIG. 13 is an elevational sectional view showing an eighth embodiment of the carburetor according to the invention.

FIG. 13 shows an eighth embodiment of the invention. In this embodiment, a means for reforming the nature of the air-fuel mixture is provided within the auxiliary duct.

Designated at 140 is the fuel reforming means, which is provided within the auxiliary duct 36 at the upstream of the auxiliary throttle valve 38. In the instant embodiment, the fuel reforming means 140 comprises an ignition plug 141 for spark discharge and flame-arresting means 142 and 143 provided at the upstream and downstream of the ignition plug 141. The ignition plug 141 serves to ignite the rich air-fuel mixture introduced into the auxiliary duct 36 to cause incomplete combustion of the mixture, thereby reforming the nature of the fuel in the mixture while perfectly gasifying the remaining fuel. The arresting means 142 and 143 consist of a metal net or a honeycomb structure of metal or ceramics, and they serves to prevent the flame resulting from the ignition by the ignition plug 141 within the reforming means from propagating to other places and causing combustion in unnecessary portions. The arresting means 142 and 143 may be omitted if there is no risk of propagation of the flame.

With this construction, the rich air-fuel mixture collected in the auxiliary duct 36, with an air-fuel ratio of the order of 3 to 5, is subjected to incomplete combustion within the fuel reforming means 140. This incomplete combustion takes place with insufficient air. Thoeretically, an air-fuel mixture with an air-fuel ratio of 3 to 5 is incapable of ignition. Actually, however, the majority of the fuel in the rich air-fuel mixture is in the liquid phase, with the remaining fuel in the gaseous phase constituting with air the true mixture, and this true mixture is ignited to result in the incomplete combustion. Through this incomplete combustion, the fuel in the rich air-fuel mixture is partly converted to $H_2$, $CH$, $CH_4$ and the like if the fuel is gasoline. Also, the remaining fuel is gasified through this endothermic reaction. The gap of the spark discharge by the ignition plug 141 may be appropriately selected in accordance with the intended degree of reformation of fuel.

The afore-mentioned reformation and gasification of fuel are effected at the upstream of the auxiliary throttle valve 38. Since the intake negative pressure of the internal combustion engine is not directly led to the upstream side of the auxiliary throttle valve 38, the pressure in this portion will not be much lower than the atmospheric pressure. Thus, no deterioration is seen in the performance of ignition by the ignition plug 141, and the above reformation and gasification of fuel may be reliably achieved under whatever engine operating condition. Moreover, through the incomplete combustion the homogenity of the rich air-fuel mixture is improved for the resultant mixture is composed of the gaseous fluid and air. Thus, uniformity of fuel distribution among the individual engine cylinders can be enhanced, which is desirous from the standpoint of reliable combustion.

Figure 14:
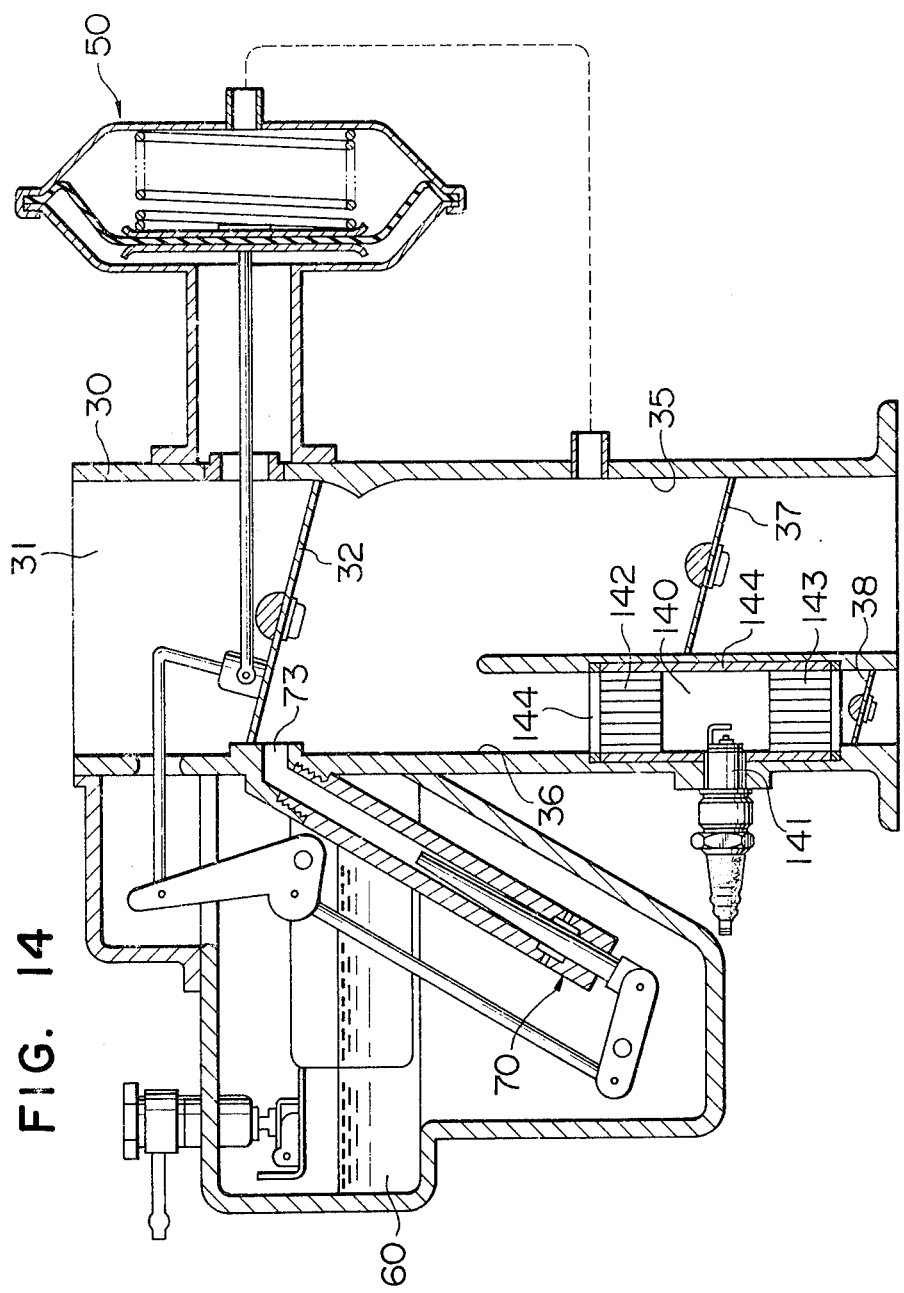
FIG. 14 is an elevational sectional view showing a nineth embodiment of the carburetor according to the invention.

FIG. 14 shows a nineth embodiment of the invention. This embodiment is similar to the preceding eighth embodiment except that in the fuel reforming means the region where the rich air-fuel mixture is subjected to incomplete combustion for reformation and gasification of fuel it is surrounded by a heat insulator. More particularly, a heat insulator 144 (which may be of a well-known material) is applied to the inner wall of the auxiliary duct 36 between the upstream end of the upstream side arresting means 142 and the downstream end of the downstream side arresting means 143.

In this embodiment, heat generated by the incomplete combustion of the rich air-fuel mixture is transferred only a little to the outside. Thus, a fire hazard due to the heat of the incomplete combustion is eliminated, while providing for improved functions of reforming and gasifying fuel within the fuel reforming means.

What we claim is:

1. In a torch ignition internal combusion engine comprising:
   a cylinder;
   a piston;
   a cylinder head secured to said cylinder and defining in combination with said piston and cylinder a combustion chamber;
   a suction port in communication with said combustion chamber adapted to receive a lean air-fuel mixture;
   an intake valve disposed in said suction port and comprising a valve head and a valve stem integrally associated therewith;
   a suction passage having an open end thereof disposed within said suction port in the vicinity of said valve head adapted to receive a rich mixture;
   a trap chamber disposed in said cylinder head adapted to receive said rich mixture, said trap chamber having at least one suction aperture through which said rich mixture is introduced into said trap chamber when said intake vavle is opened, said trap chamber also having at least one discharge aperture through which residual gas remaining in said trap chamber is discharged into said combustion chamber; and
   a spark plug having a set of electrodes exposed to the inside of said trap chamber for igniting the rich mixture introduced thereinto;
   a carburetor comprising:
   means defining an air passage connected at one end to said suction port and suction passage, and the other end thereof communicating with the atmosphere, said air passage passing air from the atmosphere to said suction port and suction passage;
   fuel supplying means opening to said air passage for supplying fuel to said air passage to thereby form an air-fuel mixture directly downstream of said fuel supplying means, said air-fuel mixture having a relatively rich portion at a central portion of a cross-sectional area substantially perpendicular to the flow of said air-fuel mixture in said air passage and being relatively lean in the outer portions of said cross-sectional area, the amount of fuel supplied being so controlled as to be in response to the amount of air passing through said air passage;
   partition means disposed in said air passage downstream of said fuel supplying means extending substantially parallel to the flow of said air-fuel mixture and be in position between the fuel supply means opening and the opposing wall of the air passage for forming a first intake pipe connected to said suction port and a second intake pipe connected to said suction passage, said second intake pipe being disposed closer to said fuel supplying means than said first intake pipe, said second intake pipe having a rich air-fuel mixture receiving upstream end, said upstream end having a cross-sectional area in line with the flow of said rich portion of said air-fuel mixture; and
   a first and a second throttle valve respectively disposed in said first and second intake pipes, said leaner air-fuel mixture being introduced into said suction port in response to opening of said first throttle valve and said richer air-fuel mixture being introduced into said suction passage in response to opening of said second throttle valve.

2. In a torch ignition internal combustion engine comprising:
   a cylinder;
   a piston;
   a cylinder head secured to said cylinder and defining in combination with said piston and cylinder a combustion chamber;
   a suction port in communication with said combustion chamber adapted to receive a lean air-fuel mixture;
   an intake valve disposed in said suction port and comprising a valve head and a valve stem integrally associated therewith;
   a suction passage having an open end thereof disposed within said suction port in the vicinity of said valve head adapted to receive a rich mixture;
   a trap chamber disposed in said cylinder head adapted to receive said rich mixture, said trap chamber having at least one suction aperture through which said rich mixture is introduced into said trap chamber when said intake vavle is opened, said trap chamber also having at least one discharge aperture through which residual gas remaining in said trap chamber is discharged into said combustion chamber; and
   a spark plug having a set of electrodes exposed to the inside of said trap chamber for igniting the rich mixture introduced thereinto;
   a carburetor comprising:
   means defining an air passage connected at one end to said suction port and suction passage, and the other end thereof communicating with the atmosphere, said air passage passing air from the atmosphere to said suction port and suction passage;
   fuel supplying means opening to said air passage for supplying fuel to said air passage, thereby forming a heterogeneous air-fuel mixture directly downstream of said fuel supplying means, the amount of fuel supplied being so controlled as to be in response to the amount of air passing through said air passage;
   partition means disposed in said air passage downstream of said fuel supplying means extending substantially parallel to the flow of said air-fuel mixture and be in position between the fuel supply means opening and the opposing wall of the air passage for forming a first intake pipe connected to said suction port and a second intake pipe connected to said suction passage, said second intake pipe being disposed closer to said fuel supplying means than said first intake pipe, said second pipe having a rich air-fuel mixture receiving orifice and a longitudinal axis proximate said orifice substantially aligned with the direction of flow of said air-fuel mixture in said air passage; and
   a first and a second throttle valve respectively disposed in said first and second intake pipes, said leaner air-fuel mixture being introduced into said suction port in response to opening of said first throttle valve and said richer air-fuel mixture being introduced into said suction passage in response to opening of said second throttle valve.

3. In a torch ignition internal combustion engine comprising:
   a cylinder;
   a piston;
   a cylinder head secured to said cylinder and defining in combination with said piston and cylinder a combustion chamber;
   a suction port in communication with said combustion chamber adapted to receive a lean air-fuel mixture;
   an intake valve disposed in said suction port and comprising a valve head and a valve stem integrally associated therewith;
   a suction passage having an open end thereof disposed within said suction port in the vicinity of said valve head adapted to receive a rich mixture;
   a trap chamber disposed in said cylinder head adapted to receive said rich mixture, said trap chamber having at least one suction aperture through which said rich mixture is introduced into said trap chamber when said intake valve is opened, said trap chamber also having at least one discharge aperture through which residual gas remaining in said trap chamber is discharged into said combustion chamber; and
   a spark plug having a set of electrodes exposed to the inside of said trap chamber for igniting the rich mixture introduced thereinto;
   a carburetor comprising:
   means defining an air passage connected at one end to said suction port and suction passage, and the other end thereof communicating with the atmosphere, said air passage passing air from the atmosphere to said suction portion and suction passage;
   fuel supplying means opening to said air passage for supplying fuel to said air passage, thereby forming a heterogeneous air-fuel mixture directly downstream of said fuel supplying means, the amount of fuel supplied being so controlled as to be in response to the amount of air passing through said air passage;
   partition means disposed in said air passage downstream of said fuel supplying means extending substantially parallel to the flow of said air-fuel mixture and be in position between the fuel supply means opening and the opposing wall of the air passage for forming a first intake pipe connected to said suction port and a second intake pipe connected to said suction passage, said second intake pipe being disposed closer to said fuel supplying means than said first intake pipe, said second intake pipe having a rich air-fuel mixture receiving upstream end, said upstream end having a cross-section substantially perpendicular to the flow of said air-fuel mixture in said air passage; and
   a first and a second throttle valve respectively disposed in said first and second intake pipes, said leaner air-fuel mixture being introduced into said suction port in response to opening of said first throttle valve and said richer air-fuel mixture being introduced into said suction passage in response to opening of said second throttle valve.

4. A carburetor as set forth in claim 3, further comprising:
   area control means pivotally coupled at the top portion of said partition means for varying the sectional area ratio between said first and second intake pipes upstream of said partition means; and
   link means mechanically connected between said area control means and said first throttle valve, whereby said area control means is pivoted in response to the movement of said first throttle valve.

5. A carburetor as set forth in claim 3 further comprising:
   fuel reforming means disposed in said second intake pipe for converting the richer air-fuel mixture into a reformed gaseous mixture.

6. A carburetor as set forth in claim 5, wherein siad fuel reforming means includes:
   first and second flame arresting means disposed in said second intake pipe upstream of said second throttle valve; and
   a spark plug disposed in said second intake pipe between said first and second flame arresting means for imperfectly burning the richer air-fuel mixture, to thereby convert the richer air-fuel mixture into a reformed gaseous mixture.

7. A carburetor as set forth in claim 5, further comprising:
   a heat insulator for enclosing said fuel reforming means.

8. A carburetor as set forth in claim 3 further including air metering means in said air passage upstream from said partition means for metering air flow comprising:
   an air valve disposed in said air passage and angularly displaceable around an axis;
   a diaphragm unit coupled to the outside of said air passage, and including a diaphragm disposed in said diaphragm unit for forming a first and a second pressure chamber, and a rod connected at its one end to said diaphragm, the other end thereof being coupled to said air valve;
   said first pressure chamber being communicated with said air passage downstream of said air valve at a downstream location;
   said second pressure chamber being communicated with said air passage upstream of said air valve at an upstream location, whereby said diaphragm is displaced in accordance with the pressure difference between the pressures in said first and second pressure chambers, thus to angularly displace said air valve in accordance with said pressure difference.

9. A carburetor as set forth in claim 8, wherein said fuel supplying means comprises:
   a float bowl coupled to the outside of said air passage for storing fuel therein;
   a fuel nozzle opening to said air passage directly downstream of said air valve;
   a fuel jet tube connected in fluid communication between said fuel nozzle and said float bowl;
   a needle valve disposed at its one end in said fuel jet tube and longitudinally movable therein; and
   link means mechanically connected between the other end of said rod and the other end of said needle valve, whereby said needle valve is longitudinally disposed in said fuel jet tube in accordance with the movement of said diaphragm, to thereby control the opening degree of said fuel jet tube in accordance with the longitudinal displacement of said needle valve.

10. A carburetor as set forth in claim 9, wherein said air metering means includes:
    an air valve adapter coupled to a downstream side of said air valve in the proximity of said fuel nozzle, whereby the area of the throttled air passage defined between said air valve adapter and the inner wall of said air passage varies continuously and grandually.

11. A carburetor as set forth in claim 3, further comprising:
auxiliary fuel supplying means opening into said second intake pipe for supplying auxiliary fuel thereto under a certain operational condition of said internal combustion engine.

12. A carburetor as set forth in claim 11, wherein said auxiliary fuel supplying means includes:
at least one port opening to said second intake pipe;
a fuel passage connected at one end to said port and at the other end to a float bowl storing the fuel therein;
a fuel jet disposed in said fuel passage for metering the amount of the fuel flowing therethrough;
an auxiliary air passage opening at its one end to said fuel passage and at the other end to the atmosphere;
an air jet disposed in said auxiliary air passage for metering the amount of the air passing therethrough; and
fuel cut-off means coupled to said auxiliary air passage for controlling the delivery and the stoppage of the fuel through said port to said second intake pipe.

13. A carburetor as set forth in claim 12, wherein said fuel cut-off means is actuated to stop supplying the fuel when said second throttle valve is suddenly closed.

14. A carburetor as set forth in claim 12, wherein said auxiliary fuel supplying means further includes:
a further air passage opening at one end to said fuel passage and at the other end to the atmosphere; and
a further air jet disposed in said further air passage for metering the amount of the air passing therethrough.

15. A carburetor as set forth in claim 11, wherein said auxiliary fuel supplying means includes:
at least one port opening into said second intake pipe;
a fuel passage connected at one end to said port and at the other end to a float bowl for storing fuel therein;
a fuel jet disposed in said fuel passage for metering the amount of the fuel flowing therethrough; and
fuel cut-off means coupled to said fuel passage for controlling the delivery and the stoppage of the fuel through said port.

16. A carburetor as set forth in claim 15, further comprising:
an actuating coil coupled to said fuel cut-off means for actuating the same to close said fuel passage when energized; and
a control circuit connected to said actuating coil for energizing the same both (1) when the operational speed of said engine exceeds a predetermined value, and (2) when a gear transmission is disengaged.

17. A carburetor as set forth in claim 15, further comprising:
an auxiliary air passage opening at one end into said fuel passage and at the other end to the atmosphere; and
an air jet disposed in said auxiliary air passage for metering the amount of the air passing therethrough.

18. A carburetor as set forth in claim 15, wherein said fuel cut-off means includes an actuable valve element mounted for movement in said fuel passage between a fuel blocking position and a fuel passing position and means for causing said valve element to move to said blocking position where said second throttle valve is suddenly closed.

19. A carburetor as et forth in claim 18, wherein said causing means includes an electromagnetic coil.

20. In a stratified charge internal combustion engine comprising:
a cylinder;
a piston;
a cylinder head secured to said cylinder and defining in combination with said piston and cylinder a combustion chamber;
a spark plug having a set of electrodes exposed to said combustion chamber;
a suction port means operatively in communication with said combustion chamber for introducing a lean air-fuel mixture thereto;
an intake valve disposed in said suction port and comprising a valve head and a valve stem integrally associated therewith; and
a suction passage means having an open end thereof disposed within said suction port in the vicinity of said valve head for introducing a rich air-fuel mixture into said combustion chamber around said set of electrodes of said spark plug,
a carburetor comprising:
means defining an air passage connected to one end to said suction port and suction passage, and the other end thereof communicating with the atmosphere, said air passage passing air from the atmosphere to said suction port and suction passage;
fuel supplying means opening to said air passage for supplying fuel to said air passage, thereby forming a heterogeneous air-fuel mixture directly downstream of said fuel supplying means, the amount of fuel supplied being so controlled as to be in response to the amount of air passing through said air passage;
partition means disposed in said air passage downstream of said fuel supplying means extending substantially parallel to the flow of said air-fuel mixture and be in position between the fuel supply means opening and the opposing wall of the air passage for forming a first intake pipe connected to said suction port and a second intake pipe connected to said suction passage, said second intake pipe being disposed closer to said fuel supplying means than said first intake pipe said second intake pipe having a rich air-fuel mixture receiving upstream end, said upstream end having a cross-sectional area substantially perpendicular to the flow of said air-fuel mixture in said air passage; and
a first and a second throttle valve respectively disposed in said first and second intake pipes, said leaner air-fuel mixture being introduced into said suction port in response to opening of said first throttle valve and the richer air-fuel mixture being introduced into said suction passage in response to opening of said second throttle valve.

21. A carburetor as set forth in claim 20, further comprising:
area control means pivotally coupled at the top portion of said partition means for varying the sectional area ratio between said first and second intake pipes upstream of said partition means; and
link means mechanically connected between said area control means and said first throttle valve, whereby said area control means is pivoted in response to the movement of said first throttle valve.

22. A carburetor as set forth in claim 20, further including said air metering means in said air passage upstream from said partition means for metering air flow comprising:
   an air valve disposed in said air passage and angularly displaceable around an axis;
   a diaphragm unit coupled to the outside of said air passage, and including a diaphragm disposed in said diaphragm unit for forming a first and a second pressure chamber, and a rod connected at its one end to said diaphragm, the other end thereof being coupled to said air valve;
   said first pressure chamber being communicated with said air passage downstream of said air valve at a downstream location;
   said second pressure chamber being communicated with said air passage upstream of said air valve at said upstream location, wereby said diaphragm is displaced in accordance with the pressure difference between the pressures in said first and second pressure chambers, thus to angularly displace said air valve in accordance with said pressure difference.

23. A carburetor as set forth in claim 22 wherein said fuel supplying means comprises:
   a float bowl coupled to the outside of said air passage for storing fuel therein;
   a fuel nozzle opening to said air passage directly downstream of said air valve;
   a fuel jet tube connected in fluid communication between said fuel nozzle and said float bowl;
   a needle valve disposed at its one end in said fuel jet tube and longitudinally movable therein; and
   link means mechanically connected between the other end of said rod and the other end of said needle valve, whereby said needle valve is longitudinally disposed in said fuel jet tube in accordance with the movement of said diaphragm, to thereby control the opening degree of said fuel jet tube in accordance with the longitudinal displacement of said needle valve.

24. A carburetor as set forth in claim 23, wherein said air metering means includes:
   an air valve adapter coupled to a downstream side of said air valve in the proximity of said fuel nozzle, whereby the area of the throttled air passage defined between said air valve adapter and the inner wall of said air passage varies continuously and gradually.

25. A carburetor as set forth in claim 20, further comprising:
   fuel reforming means disposed in said second intake pipe for converting the richer air-fuel mixture into a reformed gaseous mixture.

26. A carburetor as set forth in claim 25, wherein said fuel reforming means includes:
   first and second flame arresting means disposed in said second intake pipe upstream of said second throttle valve; and
   a spark plug disposed in said second intake pipe between said first and second flame arresting means for imperfectly burning the richer air-fuel mixture, to thereby convert the richer air-fuel mixture into a reformed gaseous mixture.

27. A carburetor as set forth in claim 25, further comprising:
   a heat insulator for enclosing said fuel reforming means.

28. A carburetor as set forth in claim 20, further comprising:
   auxiliary fuel supplying means opening into said second intake pipe for supplying auxiliary fuel thereto under a certain operational condition of said internal combustion engine.

29. A carburetor as set forth in claim 28, wherein said auxiliary fuel supplying means includes:
   at least one port opening to said second intake pipe;
   a fuel passage connected at one end to said port and at the other end to a float bowl storing the fuel therein;
   a fuel jet disposed in said fuel passage for metering the amount of the fuel flowing therethrough;
   an auxiliary air passage opening at its one end to said fuel passage and at the other end to the atmosphere;
   an air jet disposed in said auxiliary air passage for metering the amount of the air passing therethrough; and
   fuel cut-off means coupled to said auxiliary air passage for controlling the delivery and the stoppage of the fuel through said port to said second intake pipe.

30. A carburetor as set forth in claim 29, wherein said fuel cut-off means is actuated to stop supplying the fuel when said second throttle valve is suddenly closed.

31. A carburetor as set gorth in claim 29, wherein said auxiliary fuel supplying means further includes:
   a further air passage opening at one end to said fuel passage and at the other end to the atmosphere; and
   a further air jet disposed in said further air passage for metering the amount of the air passing therethrough.

32. A carburetor as set forth in claim 28, wherein said auxiliary fuel supplying means includes:
   at least one port opening into said second intake pipe;
   a fuel passage connected at one end to said port and at the other end to a float bowl for storing fuel therein;
   a fuel jet disposed in said fuel passage for metering the amount of the fuel flowing therethrough; and
   fuel cut-off means coupled to said fuel passage for controlling the delivery and the stoppage of the fuel through said port.

33. A carburetor as set forth in claim 32 further comprising:
   an auxiliary air passage opening at one end into said fuel passage and at the other end to the atmosphere; and
   an air jet disposed in said auxiliary air passage for metering the amount of the air passing therethrough.

34. A carburetor as set forth in claim 32, further comprising:
   an actuating coil coupled to said fuel cut-off means for actuating the same to close said fuel passage when energized; and
   a control circuit connected to said actuating coil for energizing the same both (1) when the operational speed of said engine exceeds a predetermined value, and (2) when a gear transmission is disengaged.

35. A carburetor as set forth in claim 32, wherein said fuel cut-off means includes an actuable valve element mounted for movement in said fuel passage between a fuel blocking position and a fuel passing position and means for causing said valve element to move to said blocking position where said second throttle valve is suddenly closed.

36. A carburetor as set forth in claim 35, wherein said causing means includes an electromagnetic coil.

37. In a torch ignition internal combustion engine comprising:
a cylinder;
a piston;
a cylinder head secured to said cylinder and defining in combination with said piston and cylinder a main combustion chamber;
a suction port operatively in communication with said main combustion chamber adapted to receive a lean air-fuel mixture;
an auxiliary combustion chamber means disposed in said main combustion chamber for producing and spurting a torch flame into said main combustion chamber; and
a suction passage means operatively in communication with said auxiliary combustion chamber for introducing a rich air-fuel mixture thereto,
a carburetor comprising:
means defining an air passage connected at one end to said suction port and suction passage, and the other end thereof communicating with the atmosphere, said air passage passing air from the atmosphere, to said suction port and suction passage;
fuel supplying means opening to said air passage for supplying fuel to said air passage, thereby forming a heterogeneous air-fuel mixture directly downstream of said fuel supplying means, the amount of fuel supplied being so controlled as to be in response to the amount of air passing through said air passage;
partition means disposed in said air passage downstream of said fuel supplying means extending substantially parallel to the flow of said air-fuel mixture and be in position between the fuel supply means opening and the opposing wall of the air passage for forming a first intake pipe connected to said suction port and a second intake pipe connected to said suction passage, said second intake pipe being disposed closer to said fuel supplying means than said first intake pipe, said second intake pipe having a rich air-fuel mixture receiving upstream end, said upstream end having a cross sectional area substantially perpendicular to the flow of said air-fuel mixture in said air passage; and
a first and a second throttle valve respectively disposed in said first and second intake pipes, said leaner air-fuel mixture being introduced into said suction port in response to opening of said first throttle valve and said richer air-fuel mixture being introduced into said suction passage in response to opening of said second throttle valve.

38. A carburetor as set forth in claim 37, further comprising:
area control means pivotally coupled at the top portion of said partition means for varying the sectional area ratio between said first and second intake pipes upstream of said partition means; and
link means mechanically connected between said area control means and said first throttle valve, whereby said area control means is pivoted in response to the movement of said first throttle valve.

39. A carburetor as set forth in claim 37, further including said air metering means in said air passage upstream from said partition means for metering air flow comprising:
an air valve disposed in said air passage and angularly displaceable around an axis;
a diaphragm unit coupled to the outside of said air passage, and including a diaphragm disposed in said diaphragm unit for forming a first and a second pressure chamber, and a rod connected at its one end to said diaphragm, the other end thereof being coupled to said air valve;
said first pressure chamber being communicated with said air passage downstream of said air valve at a downstream location;
said second pressure chamber being communicated with said air passage upstream of said air valve at said upstream location, whereby said diaphragm is displaced in accordance with the pressure difference between the pressures in said first and second pressure chambers, thus to angularly displace said air valve in accordance with said pressure difference.

40. A carburetor as set forth in claim 39, wherein said fuel supplying means comprises:
a float bowl coupled to the outside of said air passage for storing fuel therein;
a fuel nozzle opening to said air passage directly downstream of said air valve;
a fuel jet tube connected in fluid communication between said fuel nozzle and said float bowl;
a needle valve disposed at its one end in said fuel jet tube and longitudinally movable therein; and
link means mechanically connected between the other end of said rod and the other end of said needle valve, whereby said needle valve is longitudinally disposed in said fuel jet tube in accordance with the movement of said diaphgram, to thereby control the opening degree of said fuel jet tube in accordance with the longitudinal displacement of said needle valve.

41. A carburetor as set forth in claim 40, wherein an air metering means includes:
an air valve adapter coupled to a downstream side of said air valve in the proximity of said fuel nozzle, whereby the area of the throttled air passage defined between said air valve adapter and the inner wall of said air passage varies continuously and gradually.

42. A carburetor as set forth in claim 37 further comprising:
fuel reforming means disposed in said second intake pipe for converting the richer air-fuel mixture into a reformed gaseous mixture.

43. A carburetor as set forth in claim 42, wherein said fuel reforming means includes:
first and second flame arresting means disposed in said second intake pipe upstream of said second throttle valve; and
a spark plug disposed in said second intake pipe between said first and second flame arresting means for imperfectly burning the richer air-fuel mixture, to thereby convert the richer air-fuel mixture into a reformed gaseous mixture.

44. A carburetor as set forth in claim 42, further comprising:
a heat insulator for enclosing said fuel reforming means.

45. A carburetor as set forth in claim 37, further comprising:

auxiliary fuel supplying means opening into said second intake pipe for supplying auxiliary fuel thereto under a certain operational condition of said internal combustion engine.

46. A carburetor as set forth in claim 45, wherein said auxiliary fuel supplying means includes:
   at least one port opening to said second intake pipe;
   a fuel passage connected at one end to said port and at the other end to a float bowl storing the fuel therein;
   a fuel jet disposed in said fuel passage for metering the amount of the fuel flowing therethrough;
   an auxiliary air passage opening at its one end to said fuel passage and at the other end to the atmosphere;
   an air jet disposed in said auxiliary air passage for metering the amount of the air passing therethrough; and
   fuel cut-off means coupled to said auxiliary air passage for controlling the delivery and the stoppage of the fuel through said port to said second intake pipe.

47. A carburetor as set forth in claim 46, wherein said fuel cut-off means is actuated to stop supplying the fuel when said second throttle valve is suddenly closed.

48. A carburetor as set forth in claim 46, wherein said auxiliary fuel supplying means further includes:
   a further air passage opening at one end to said fuel passage and at the other end to the atmosphere; and
   a further air jet disposed in said further air passage for metering the amount of the air passing therethrough.

49. A carburetor as set forth in claim 45, wherein said auxiliary fuel supplying means includes:
   at least one port opening into said second intake pipe;
   a fuel passage connected at one end to said port and at the other end to a float bowl for storing fuel therein;
   a fuel jet disposed in said fuel passage for metering the amount of the fuel flowing therethrough; and
   fuel cut-off means coupled to said fuel passage for controlling the delivery and the stoppage of the fuel through said port.

50. A carburetor as set forth in claim 49 further comprising:
   an auxiliary air passage opening at one end into said fuel passage and at the other end to the atmosphere; and
   an air jet disposed in said auxiliary air passage for metering the amount of the air passing therethrough.

51. A carburetor as set forth in claim 49, further comprising:
   an actuating coil coupled to said fuel cut-off means for actuating the same to close said fuel passage when energized; and
   a control circuit connected to said actuating coil for energizing the same both (1) when the operational speed of said engine exceeds a predetermined value and (2) when a gear transmission is disengaged.

52. A carburetor as set forth in claim 49, wherein said fuel cut-off means includes an actuable valve element mounted for movement in said fuel passage between a fuel blocking position and a fuel passing position and means for causing said valve element to move to said blocking position when said second throttle valve is suddenly closed.

53. A carburetor as set forth in claim 52, wherein said causing means includes an electromagnetic coil.

* * * * *